United States Patent
Hong

(10) Patent No.: US 10,320,738 B2
(45) Date of Patent: Jun. 11, 2019

(54) ADDRESS ALLOCATION METHOD, CGN DEVICE, AND CGN DUAL-ACTIVE SYSTEM

(71) Applicant: Huawei Technologies Co., Ltd., Shenzhen (CN)

(72) Inventor: Fangyun Hong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 130 days.

(21) Appl. No.: 15/596,716

(22) Filed: May 16, 2017

(65) Prior Publication Data
US 2017/0250944 A1 Aug. 31, 2017

Related U.S. Application Data

(63) Continuation of application No. PCT/CN2015/088137, filed on Aug. 26, 2015.

(30) Foreign Application Priority Data

Dec. 18, 2014 (CN) .......................... 2014 1 0795836

(51) Int. Cl.
*H04L 29/12* (2006.01)
*H04L 12/26* (2006.01)
(Continued)

(52) U.S. Cl.
CPC .............. *H04L 61/10* (2013.01); *H04L 43/10* (2013.01); *H04L 45/741* (2013.01);
(Continued)

(58) Field of Classification Search
CPC ....... H04L 61/10; H04L 43/10; H04L 49/254; H04L 45/741; H04L 61/2514; H04L 61/2517; H04L 61/2532; H04L 61/2535
See application file for complete search history.

(56) References Cited

U.S. PATENT DOCUMENTS

| 9,614,761 B1* | 4/2017 | Kamisetty | ............... H04L 63/02 |
| 2005/0152305 A1* | 7/2005 | Ji | ........................... H04L 45/54 370/328 |

(Continued)

FOREIGN PATENT DOCUMENTS

| CN | 101136926 A | 3/2008 |
| CN | 101834831 A | 9/2010 |

(Continued)

OTHER PUBLICATIONS

Machine Translation and Abstract of Chinese Publication No. CN101136926, Mar. 5, 2008, 7 pages.
(Continued)

*Primary Examiner* — Will W Lin
(74) *Attorney, Agent, or Firm* — Conley Rose, P.C.

(57) ABSTRACT

An address allocation method, a carrier grade network address translation (CGN) device, and a CGN dual-active system, where a second CGN device receives a first to-be-sent packet sent by a network address translation (NAT) device, searches a recorded correspondence between a private network address, a public network address, and a port range for a source address of the first to-be-sent packet, sends an address allocation request used to request a public network address and a port range of the source address to a first CGN device when a search result indicating that no source address of the first to-be-sent packet is found. The first CGN device allocates a public network address and a port range to the source address of the first to-be-sent packet, records the network address and the port range, and synchronies the allocated public network address and the allocated port range to the second CGN device.

20 Claims, 14 Drawing Sheets

(51) Int. Cl.
*H04L 12/749* (2013.01)
*H04L 12/937* (2013.01)

(52) U.S. Cl.
CPC ........ *H04L 49/254* (2013.01); *H04L 61/2514* (2013.01); *H04L 61/2517* (2013.01); *H04L 61/2532* (2013.01); *H04L 61/2535* (2013.01)

(56) References Cited

U.S. PATENT DOCUMENTS

| | | | | |
|---|---|---|---|---|
| 2011/0268121 | A1* | 11/2011 | Karino | H04L 12/4633 370/392 |
| 2012/0005299 | A1 | 1/2012 | Xu | |
| 2013/0067110 | A1* | 3/2013 | Sarawat | H04L 61/2517 709/238 |
| 2013/0166776 | A1* | 6/2013 | Gao | H04L 61/2532 709/245 |
| 2013/0294461 | A1* | 11/2013 | Zhou | H04L 61/2532 370/475 |
| 2013/0346629 | A1* | 12/2013 | Wang | H04L 61/2532 709/245 |
| 2014/0006593 | A1* | 1/2014 | Sarawat | H04M 15/58 709/224 |
| 2014/0092899 | A1* | 4/2014 | Krishna | H04L 61/2517 370/389 |
| 2015/0373094 | A1* | 12/2015 | Wang | H04L 61/2532 709/223 |

FOREIGN PATENT DOCUMENTS

| | | |
|---|---|---|
| CN | 102377628 A | 3/2012 |
| CN | 102594933 A | 7/2012 |
| CN | 103188154 A | 7/2013 |
| CN | 104219334 A | 12/2014 |

OTHER PUBLICATIONS

Machine Translation and Abstract of Chinese Publication No. CN103188154, Jul. 3, 2013, 13 pages.
Foreign Communication From a Counterpart Application, European Application No. 15869072.7, Extended European Search Report dated Jul. 17, 2017, 11 pages.
Foreign Communication From a Counterpart Application, PCT Application No. PCT/CN2015/077213, English Translation of International Search Report dated Aug. 20, 2015, 3 pages.
Foreign Communication From a Counterpart Application, PCT Application No. PCT/CN2015/077213, English Translation of Written Opinion dated Aug. 20, 2015, 7 pages.
Machine Translation and Abstract of Chinese Publication No. CN104219334, Dec. 17, 2014, 22 pages.
Foreign Communication From a Counterpart Application, Chinese Application No. 201410795836.5, Chinese Office Action dated Mar. 19, 2019, 6 pages.

* cited by examiner

ADDRESS ALLOCATION METHOD, CGN DEVICE, AND CGN DUAL-ACTIVE SYSTEM

CROSS-REFERENCE TO RELATED APPLICATIONS

This application is a continuation of International Patent Application No. PCT/CN2015/088137 filed on Aug. 26, 2015, which claims priority to Chinese Patent Application No. 201410795836.5 filed on Dec. 18, 2014. The disclosures of the aforementioned applications are hereby incorporated by reference in their entireties.

TECHNICAL FIELD

The present disclosure relates to the field of mobile communications technologies, and in particular, to an address allocation method, a carrier grade network address translation (CGN) device, and a CGN dual-active system.

BACKGROUND

Broadband users of a metropolitan area network are in a huge quantity, and are a main force of consuming Internet Protocol version 4 (IPv4) addresses. In the face of exhaustion of IPv4 addresses, introducing the Internet Protocol version 6 (IPv6) is an inevitable trend of network evolution. However, before IPv4 addresses are exhausted, an operator network, a service platform, a terminal, and an Internet content provider (ICP) are unable to fully support the IPv6 and to have commercial capabilities of the IPv6. In a transition period of the IPv6, a CGN technology is introduced to extend a life cycle of the IPv4 in order to ensure steady service transition and gain time for IPv6 deployment.

When using a network address translation (NAT) 444 technology, an independent CGN device such as a firewall currently supports only a centralized scenario. In a distributed scenario, there are still some problems when the CGN device uses the NAT444 technology. The centralized scenario refers to a scenario in which there is only one CGN device that performs address translation, and the distributed scenario refers to a scenario in which there are multiple CGN devices that perform address translation.

However, in a CGN dual-active scenario, both CGN devices have a function of allocating a public network address and a port range to a private network address. Therefore, the following scenario exists. Two CGN devices receive different packets from a same private network address, and the two CGN devices each allocate a public network address and a port range to the private network address, and therefore, the private network address may obtain two different public network addresses and two different port ranges.

However, to meet a source tracing requirement, the CGN device requires that a source private network address obtain a same public network address and a same port range regardless of a CGN device that is in a CGN dual-active scenario and to which data flows with the same public network address are offloaded. However, the foregoing scenario contradicts source tracing, and cannot ensure source tracing consistency.

SUMMARY

Embodiments of the present disclosure provide an address allocation method, a CGN device, and a CGN dual-active system, to resolve a problem that a CGN device in a dual-active scenario cannot meet a source tracing consistency requirement.

According to a first aspect, an address allocation method is provided, including receiving, by a first CGN device, an address allocation request sent by a second CGN device, where the address allocation request carries a first private network address, searching, by the first CGN device, a recorded correspondence between a private network address, a public network address, and a port range for the first private network address, based on a search result indicating that the first private network address is not in the correspondence, allocating, by the first CGN device, a public network address and a port range to the first private network address, and recording a correspondence between the first private network address, the allocated public network address, and the allocated port range, and synchronizing the correspondence between the first private network address, the allocated public network address, and the allocated port range to the second CGN device, where the first CGN device is a device that is preset in a CGN dual-active scenario and that is configured to allocate a public network address and a port range to a private network address, and the second CGN device is a device that is preset in a CGN dual-active scenario and that is not configured to allocate a public network address and a port range to a private network address.

With reference to the first aspect, in a first possible implementation manner of the first aspect, the method further includes obtaining, by the first CGN device, a first to-be-sent packet, searching the correspondence for a public network address and a port range that are correspondingly allocated to a source address of the first to-be-sent packet, determining, by the first CGN device based on a search result indicating that the public network address and the port range that are correspondingly allocated to the source address of the first to-be-sent packet are in the correspondence, an unallocated port from a first port set of the found port range, and replacing the source address of the first to-be-sent packet with the found public network address, and replacing a source port of the first to-be-sent packet with the determined port, to generate a modified packet, and sending the modified packet, where the port range is divided into a second port set and the first port set according to a preset division rule, the first port set is a port set that is used by the first CGN device to allocate ports, the second port set is a port set that is used by the second CGN device to allocate ports, and a port identifier in the first port set is different from a port identifier in the second port set.

With reference to the first aspect, in a second possible implementation manner of the first aspect, synchronizing the correspondence between the first private network address, the allocated public network address, and the allocated port range to the second CGN device includes determining a first port set and a second port set from the port range allocated to the first private network address, where the first port set is a port set that is used by the first CGN device to allocate ports, the second port set is a port set that is used by the second CGN device to allocate ports, and a port identifier in the first port set is different from a port identifier in the second port set, and synchronizing the second port set and the correspondence between the first private network address, the allocated public network address, and the allocated port range to the second CGN device.

With reference to the first aspect or the second possible implementation manner of the first aspect, in a third possible implementation manner of the first aspect, the method further includes receiving, by the first CGN device, a second to-be-sent packet sent by a NAT device, searching the correspondence for a public network address and a port range that are correspondingly allocated to a source address of the second to-be-sent packet, allocating a public network address and a port range to the source address of the second to-be-sent packet based on a search result indicating that the public network address and the port range that are correspondingly allocated to the source address of the second to-be-sent packet are not in the correspondence, determining a first port set and a second port set from the port range allocated to the source address of the second to-be-sent packet, and synchronizing the second port set and a correspondence between the source address of the second to-be-sent packet, the allocated public network address, and the allocated port range to the second CGN device.

With reference to the third possible implementation manner of the first aspect, in a fourth possible implementation manner of the first aspect, based on a search result indicating that the public network address and the port range that are correspondingly allocated to the source address of the second to-be-sent packet are in the correspondence, the method further includes determining an unallocated port from a first port set of the found port range, and replacing the source address of the second to-be-sent packet with the found public network address, and replacing a source port of the second to-be-sent packet with the determined port, to generate a modified packet, and sending the modified packet.

According to a second aspect, an address allocation method is provided, including receiving, by a second CGN device, a first to-be-sent packet sent by a NAT device, searching a recorded correspondence between a private network address, a public network address, and a port range for a public network address and a port range that are correspondingly allocated to a source address of the first to-be-sent packet, sending, by the second CGN device, an address allocation request to a first CGN device based on a search result indicating that the public network address and the port range that are correspondingly allocated to the source address of the first to-be-sent packet are not in the correspondence, where the address allocation request carries the source address of the first to-be-sent packet, and receiving a correspondence that is sent by the first CGN device and that is between the source address of the first to-be-sent packet, the public network address, and the port range, where the first CGN device is a device that is preset in a CGN dual-active scenario and that is configured to allocate a public network address and a port range to a private network address, and the second CGN device is a device that is preset in a CGN dual-active scenario and that is not configured to allocate a public network address and a port range to a private network address.

With reference to the second aspect, in a first possible implementation manner of the second aspect, based on a search result indicating that the public network address and the port range that are correspondingly allocated to the source address of the first to-be-sent packet are in the correspondence, the method further includes determining, by the second CGN device, an unallocated port from a second port set of the found port range, and replacing the source address of the first to-be-sent packet with the found public network address, and replacing a source port of the first to-be-sent packet with the determined port, to generate a modified packet, and sending the modified packet, where the port range is divided into a first port set and the second port set according to a preset division rule, the first port set is a port set that is used by the first CGN device to allocate ports, the second port set is a port set that is used by the second CGN device to allocate ports, and a port identifier in the first port set is different from a port identifier in the second port set.

With reference to the second aspect, in a second possible implementation manner of the second aspect, the receiving a correspondence that is sent by the first CGN device and that is between the source address of the first to-be-sent packet, the allocated public network address, and the allocated port range further includes receiving the correspondence between the source address of the first to-be-sent packet, the public network address, and the port range, and a second port set determined by the first CGN device from the port range, where the correspondence and the second port set are sent by the first CGN device, the first CGN device divides the port range into a first port set and the second port set, the first port set is a port set that is used by the first CGN device to allocate ports, the second port set is a port set that is used by the second CGN device to allocate ports, and a port identifier in the first port set is different from a port identifier in the second port set.

With reference to the second possible implementation manner of the second aspect, in a third possible implementation manner of the second aspect, the method further includes receiving a correspondence between another private network address, a public network address, and a port range, and a second port set determined by the first CGN device from the port range, where the correspondence and the second port set are sent by the first CGN device, and the other private network address is a source address of a packet sent by the NAT device and received by the first CGN device.

With reference to the second possible implementation manner of the second aspect, or the third possible implementation manner of the second aspect, in a fourth possible implementation manner of the second aspect, based on a search result indicating that the public network address and the port range that are correspondingly allocated to the source address of the first to-be-sent packet are in the correspondence, the method further includes determining, by the second CGN device, an unallocated port from a second port set of the found port range, and replacing the source address of the first to-be-sent packet with the found public network address, and replacing a source port of the first to-be-sent packet with the determined port, to generate a modified packet, and sending the modified packet.

According to a third aspect, a CGN device that is used as a first CGN device is provided, including a receiving module configured to receive an address allocation request sent by a second CGN device, where the address allocation request carries a first private network address, a search module configured to search a recorded correspondence between a private network address, a public network address, and a port range for the first private network address received by the receiving module, an allocation module configured to allocate, based on a search result indicating that the first private network address is not in the correspondence, a public network address and a port range to the first private network address, and record a correspondence between the first private network address, the allocated public network address, and the allocated port range, where the search result is obtained by the search module, and a sending module configured to synchronize, to the second CGN device, the correspondence between the first private network address, the public network address allocated by the allocation module, and the port range allocated by the allocation module, where the CGN device is a device that is preset in a CGN dual-active scenario and that is configured to allocate a public network address and a port range to a private network address, and the second CGN device is a device that is preset in a CGN dual-active scenario and that is not configured to allocate a public network address and a port range to a private network address.

With reference to the third aspect, in a first possible implementation manner of the third aspect, the CGN device further includes an obtaining module and a port determining module. The obtaining module is configured to obtain a first to-be-sent packet. The search module is further configured to search the correspondence for a public network address and a port range that are correspondingly allocated to a source address of the first to-be-sent packet obtained by the obtaining module. The port determining module is configured to determine, based on a search result indicating that the public network address and the port range that are correspondingly allocated to the source address of the first to-be-sent packet are in the correspondence, an unallocated port from a first port set of the port range found by the search module, where the search result is obtained by the search module, and the sending module is further configured to replace the source address of the first to-be-sent packet with the public network address found by the search module, and replace a source port of the first to-be-sent packet with the port determined by the port determining module, to generate a modified packet, and send the modified packet, where the port range is divided into a second port set and the first port set according to a preset division rule, the first port set is a port set that is used by the CGN device to allocate ports, the second port set is a port set that is used by the second CGN device to allocate ports, and a port identifier in the first port set is different from a port identifier in the second port set.

With reference to the third aspect, in a second possible implementation manner of the third aspect, the allocation module is further configured to determine a first port set and a second port set from the port range allocated to the first private network address, where the first port set is a port set that is used by the CGN device to allocate ports, the second port set is a port set that is used by the second CGN device to allocate ports, and a port identifier in the first port set is different from a port identifier in the second port set, and the sending module is further configured to synchronize, to the second CGN device, the determined second port set and the correspondence between the first private network address, the public network address allocated by the allocation module, and the port range allocated by the allocation module.

With reference to the third aspect, or the second possible implementation manner of the third aspect, in a third possible implementation manner of the third aspect, the receiving module is further configured to receive a second to-be-sent packet sent by a NAT device. The search module is further configured to search the correspondence for a public network address and a port range that are correspondingly allocated to a source address of the second to-be-sent packet received by the receiving module. The allocation module is further configured to allocate a public network address and a port range to the source address of the second to-be-sent packet based on a search result indicating that the public network address and the port range that are correspondingly allocated to the source address of the second to-be-sent packet are not in the correspondence, where the search result is obtained by the search module, and determine a first port set and a second port set from the port range allocated to the source address of the second to-be-sent packet, and the sending module is further configured to synchronize, to the second CGN device, the second port set and a correspondence between the source address of the second to-be-sent packet, the public network address allocated by the allocation module, and the port range allocated by the allocation module.

With reference to the third possible implementation manner of the third aspect, in a fourth possible implementation manner of the third aspect, the CGN device further includes a port determining module. The port determining module is configured to determine, based on a search result indicating that the public network address and the port range that are correspondingly allocated to the source address of the second to-be-sent packet are in the correspondence, an unallocated port from a first port set of the port range found by the search module, where the search result is obtained by the search module, and the sending module is further configured to replace the source address of the second to-be-sent packet with the public network address found by the search module, and replace a source port of the second to-be-sent packet with the port determined by the port determining module, to generate a modified packet, and send the modified packet.

According to a fourth aspect, a CGN device that is used as a second CGN device is provided, including a receiving module configured to receive a first to-be-sent packet sent by a NAT device, a search module configured to search a recorded correspondence between a private network address, a public network address, and a port range for a public network address and a port range that are correspondingly allocated to a source address of the first to-be-sent packet received by the receiving module, and a sending module configured to send an address allocation request to a first CGN device based on a search result indicating that the public network address and the port range that are correspondingly allocated to the source address of the first to-be-sent packet are not in the correspondence, where the search result is obtained by the search module, and the address allocation request carries the source address of the first to-be-sent packet, where the receiving module is further configured to receive a correspondence between the source address of the first to-be-sent packet, the public network address, and the port range, where the correspondence is sent by the first CGN device for the address allocation request sent by the sending module, and the first CGN device is a device that is preset in a CGN dual-active scenario and that is configured to allocate a public network address and a port range to a private network address, and the CGN device is a device that is preset in a CGN dual-active scenario and that is not configured to allocate a public network address and a port range to a private network address.

With reference to the fourth aspect, in a first possible implementation manner of the fourth aspect, the CGN device further includes a port determining module. The port determining module is configured to determine, based on a search result indicating that the public network address and the port range that are correspondingly allocated to the source address of the first to-be-sent packet are in the correspondence, an unallocated port from a second port set of the port range found by the search module, where the search result is obtained by the search module. The sending module is further configured to replace the source address of the first to-be-sent packet with the public network address found by the search module, and replace a source port of the first to-be-sent packet with the port determined by the port determining module, to generate a modified packet, and send the modified packet, where the port range is divided into a first port set and the second port set according to a preset division rule, the first port set is a port set that is used by the first CGN device to allocate ports, the second port set is a port set that is used by the CGN device to allocate ports, and a port identifier in the first port set is different from a port identifier in the second port set.

With reference to the fourth aspect, in a second possible implementation manner of the fourth aspect, the receiving module is further configured to receive the correspondence between the source address of the first to-be-sent packet, the public network address, and the port range, and a second port set determined by the first CGN device from the port range, where the correspondence and the second port set are sent by the first CGN device, the first CGN device divides the port range into a first port set and the second port set, the first port set is a port set that is used by the first CGN device to allocate ports, the second port set is a port set that is used by the CGN device to allocate ports, and a port identifier in the first port set is different from a port identifier in the second port set.

With reference to the second possible implementation manner of the fourth aspect, in a third possible implementation manner of the fourth aspect, the receiving module is further configured to receive a correspondence between another private network address, a public network address, and a port range, and a second port set determined by the first CGN device from the port range, where the correspondence and the second port set are sent by the first CGN device, and the other private network address is a source address of a packet sent by the NAT device and received by the first CGN device.

With reference to the second possible implementation manner of the fourth aspect, or the third possible implementation manner of the fourth aspect, in a fourth possible implementation manner of the fourth aspect, the CGN device further includes a port determining module. The port determining module is configured to determine, based on a search result indicating that the public network address and the port range that are correspondingly allocated to the source address of the first to-be-sent packet are in the correspondence, an unallocated port from a second port set of the port range found by the search module, where the search result is obtained by the search module, and the sending module is further configured to replace the source address of the first to-be-sent packet with the public network address found by the search module, and replace a source port of the first to-be-sent packet with the port determined by the port determining module, to generate a modified packet, and send the modified packet.

According to a fifth aspect, a CGN dual-active system is provided, including the CGN device according to the third aspect or any possible implementation manner of the third aspect, and the CGN device according to the fourth aspect or any possible implementation manner of the fourth aspect.

According to a sixth aspect, a CGN device that is used as a first CGN device is provided, including a network interface configured to receive an address allocation request sent by a second CGN device, where the address allocation request carries a first private network address, and a processor configured to search a recorded correspondence between a private network address, a public network address, and a port range for the first private network address received by the network interface, and allocate, based on a search result indicating that the first private network address is not in the correspondence, a public network address and a port range to the first private network address, and record a correspondence between the first private network address, the allocated public network address, and the allocated port range, where the network interface is further configured to synchronize, to the second CGN device, the correspondence between the first private network address, the public network address allocated by the processor, and the port range allocated by the processor, and the CGN device is a device that is preset in a CGN dual-active scenario and that is configured to allocate a public network address and a port range to a private network address, and the second CGN device is a device that is preset in a CGN dual-active scenario and that is not configured to allocate a public network address and a port range to a private network address.

With reference to the sixth aspect, in a first possible implementation manner of the sixth aspect, the network interface is further configured to obtain a first to-be-sent packet. The processor is further configured to search the correspondence for a public network address and a port range that are correspondingly allocated to a source address of the first to-be-sent packet obtained by the network interface, and determine, based on a search result indicating that the public network address and the port range that are correspondingly allocated to the source address of the first to-be-sent packet are in the correspondence, an unallocated port from a first port set of the found port range, and the network interface is further configured to replace the source address of the first to-be-sent packet with the public network address found by the processor, and replace a source port of the first to-be-sent packet with the port determined by the processor, to generate a modified packet, and send the modified packet, where the port range is divided into a second port set and the first port set according to a preset division rule, the first port set is a port set that is used by the CGN device to allocate ports, the second port set is a port set that is used by the second CGN device to allocate ports, and a port identifier in the first port set is different from a port identifier in the second port set.

With reference to the sixth aspect, in a second possible implementation manner of the sixth aspect, the processor is further configured to determine a first port set and a second port set from the port range allocated to the first private network address, where the first port set is a port set that is used by the CGN device to allocate ports, the second port set is a port set that is used by the second CGN device to allocate ports, and a port identifier in the first port set is different from a port identifier in the second port set, and the network interface is further configured to synchronize, to the second CGN device, the determined second port set and the correspondence between the first private network address, the public network address allocated by the processor, and the port range allocated by the processor.

With reference to the sixth aspect, or the second possible implementation manner of the sixth aspect, in a third possible implementation manner of the sixth aspect, the network interface is further configured to receive a second to-be-sent packet sent by a NAT device. The processor is further configured to search the correspondence for a public network address and a port range that are correspondingly allocated to a source address of the second to-be-sent packet received by the network interface, allocate a public network address and a port range to the source address of the second to-be-sent packet based on a search result indicating that the public network address and the port range that are correspondingly allocated to the source address of the second to-be-sent packet are not in the correspondence, and determine a first port set and a second port set from the port range allocated to the source address of the second to-be-sent packet, and the network interface is further configured to synchronize, to the second CGN device, the second port set and a correspondence between the source address of the second to-be-sent packet, the public network address allocated by the processor, and the port range allocated by the processor.

With reference to the third possible implementation manner of the sixth aspect, in a fourth possible implementation manner of the sixth aspect, the processor is further configured to determine, based on a search result indicating that the public network address and the port range that are correspondingly allocated to the source address of the second to-be-sent packet are in the correspondence, an unallocated port from a first port set of the found port range, and the network interface is further configured to replace the source address of the second to-be-sent packet with the public network address found by the processor, and replace a source port of the second to-be-sent packet with the port determined by the processor, to generate a modified packet, and send the modified packet.

According to a seventh aspect, a CGN device that is used as a second CGN device is provided, including a network interface configured to receive a first to-be-sent packet sent by a NAT device, and a processor configured to search a recorded correspondence between a private network address, a public network address, and a port range for a public network address and a port range that are correspondingly allocated to a source address of the first to-be-sent packet received by the network interface, where the network interface is further configured to send an address allocation request to a first CGN device based on a search result indicating that the public network address and the port range that are correspondingly allocated to the source address of the first to-be-sent packet are not in the correspondence, where the search result is obtained by the processor, and the address allocation request carries the source address of the first to-be-sent packet, the network interface is further configured to receive a correspondence between the source address of the first to-be-sent packet, the public network address, and the port range, where the correspondence is sent by the first CGN device for the address allocation request sent by the network interface, and the first CGN device is a device that is preset in a CGN dual-active scenario and that is configured to allocate a public network address and a port range to a private network address, and the CGN device is a device that is preset in a CGN dual-active scenario and that is not configured to allocate a public network address and a port range to a private network address.

With reference to the seventh aspect, in a first possible implementation manner of the seventh aspect, the processor is further configured to determine, based on a search result indicating that the public network address and the port range that are correspondingly allocated to the source address of the first to-be-sent packet are in the correspondence, an unallocated port from a second port set of the found port range, and the network interface is further configured to replace the source address of the first to-be-sent packet with the public network address found by the processor, and replace a source port of the first to-be-sent packet with the port determined by the processor, to generate a modified packet, and send the modified packet, where the port range is divided into a first port set and the second port set according to a preset division rule, the first port set is a port set that is used by the first CGN device to allocate ports, the second port set is a port set that is used by the CGN device to allocate ports, and a port identifier in the first port set is different from a port identifier in the second port set.

With reference to the seventh aspect, in a second possible implementation manner of the seventh aspect, the network interface is further configured to receive the correspondence between the source address of the first to-be-sent packet, the public network address, and the port range, and a second port set determined by the first CGN device from the port range, where the correspondence and the second port set are sent by the first CGN device, the first CGN device divides the port range into a first port set and the second port set, the first port set is a port set that is used by the first CGN device to allocate ports, the second port set is a port set that is used by the CGN device to allocate ports, and a port identifier in the first port set is different from a port identifier in the second port set.

With reference to the second possible implementation manner of the seventh aspect, in a third possible implementation manner of the seventh aspect, the network interface is further configured to receive a correspondence between another private network address, a public network address, and a port range, and a second port set determined by the first CGN device from the port range, where the correspondence and the second port set are sent by the first CGN device, and the other private network address is a source address of a packet sent by the NAT device and received by the first CGN device.

With reference to the second possible implementation manner of the seventh aspect, or the third possible implementation manner of the seventh aspect, in a fourth possible implementation manner of the seventh aspect, the processor is further configured to determine, based on a search result indicating that the public network address and the port range that are correspondingly allocated to the source address of the first to-be-sent packet are in the correspondence, an unallocated port from a second port set of the found port range, and the network interface is further configured to replace the source address of the first to-be-sent packet with the public network address found by the processor, and replace a source port of the first to-be-sent packet with the port determined by the processor, to generate a modified packet, and send the modified packet.

According to an eighth aspect, a CGN dual-active system is provided, including the CGN device according to the sixth aspect or any possible implementation manner of the sixth aspect, and the CGN device according to the seventh aspect or any possible implementation manner of the seventh aspect.

Beneficial effects of the embodiments of the present disclosure include according to the address allocation method, the CGN device, and the CGN dual-active system that are provided in the embodiments of the present disclosure, in a CGN dual-active scenario, it is preset that a first CGN device is determined as a device configured to allocate a public network address and a port range to a private network address, and that a second CGN device is determined as a device that is not configured to allocate a public network address and a port range to a private network address. The second CGN device searches a recorded correspondence between a private network address, a public network address, and a port range for a source address of the first to-be-sent packet when receiving a first to-be-sent packet sent by a NAT device, and sends an address allocation request to the first CGN device based on a search result indicating that the source address of the first to-be-sent packet is not in the correspondence. The first CGN device searches a recorded correspondence between a private network address, a public network address, and a port range for a first private network address carried in the address allocation request when receiving the address allocation request. Based on a search result indicating that the first private network address is not in the correspondence, the first CGN device allocates a public network address and a port range to the first private network address, records a correspondence between the first private network address, the allocated public network address, and the allocated port range, and synchronizes the correspondence between the first private network address, the allocated public network address, and the allocated port range to the second CGN device. In the address allocation method provided in the embodiments of the present disclosure, in two CGN devices in a CGN dual-active scenario, one CGN device (the first CGN device) is determined for allocating a public network address and a port range to a private address, and the other CGN device (the second CGN device) is determined for not allocating a public network address and a port range to a private address, thereby avoiding that two CGN devices allocate different public network addresses and different port ranges to a same private network address because the two CGN devices are not synchronized in time. Therefore, a private network can be allocated with only one public network address and one port range, source tracing consistency is ensured, and no public network address resources and port resources are wasted.

DESCRIPTION OF EMBODIMENTS

Embodiments of the present disclosure provide an address allocation method, a CGN device, and a CGN dual-active system. Embodiments of the present disclosure are described below with reference to accompanying drawings of this specification. It should be understood that the embodiments described herein are merely used to describe and explain the present disclosure, but are not intended to limit the present disclosure. The embodiments in this application and features in the embodiments may be combined with each other without conflicts.

Figure 1:
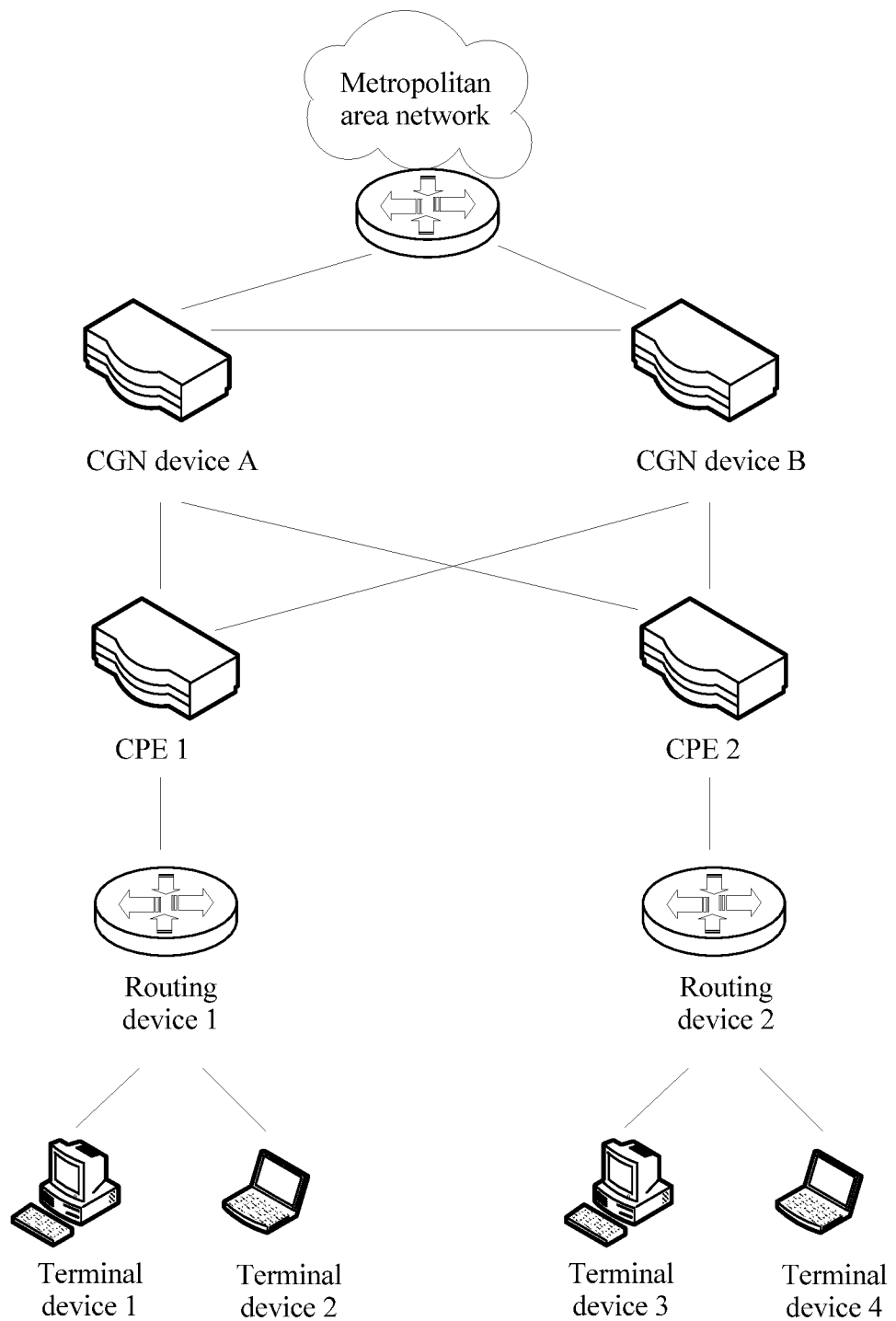
FIG. 1 is a schematic diagram of a scenario in which a CGN device uses a NAT444 technology in a CGN dual-active scenario according to an embodiment of the present disclosure.

FIG. 1 is a schematic diagram of a scenario in which a CGN device uses a NAT444 technology in a CGN dual-active scenario. In the scenario shown in FIG. 1, a terminal device 1 and a terminal device 2 access a network using a routing device 1, a terminal device 3 and a terminal device 4 access the network using a routing device 2, the terminal device 1 and the terminal device 2 translate first-layer IP addresses using customer premises equipment (CPE) 1 and using the NAT44 technology, and the terminal device 3 and the terminal device 4 translate first-layer IP addresses using CPE 2 and using the NAT44 technology. That is, addresses of multiple terminals are translated into a private network address, and a packet that uses the private network address as a source address is transmitted to a CGN device A or a CGN device B.

In some other approaches, the CGN device A and the CGN device B may allocate a public network address and a port range to the private network address in the following manner. The CGN device A or the CGN device B searches a stored user table after receiving the packet that uses the private network address as the source address, and determines whether a public network address has been allocated to the private network address, where an entry in the user table stores a private network address and a public network address and a port range that are correspondingly allocated to the private network address, and if a related entry is found, replaces the source address of the packet with the public network address that is allocated to the private network address and recorded in the found entry, replaces a source port of the packet with an unallocated port number in the port range that is allocated to the private network address, and sends a packet obtained after the replacement, or if no related entry is found, allocates a public network address and a port range to the private network address, stores the private network address, the allocated public network address, and the allocated port range into the user table such that when the packet that uses the private address as the source address needs to be sent, an unallocated port is determined from the port range allocated to the private address, replaces the source address of the packet with the allocated public network address, replaces a source port of the packet with the determined port, and sends a packet obtained after the replacement.

Figure 2:
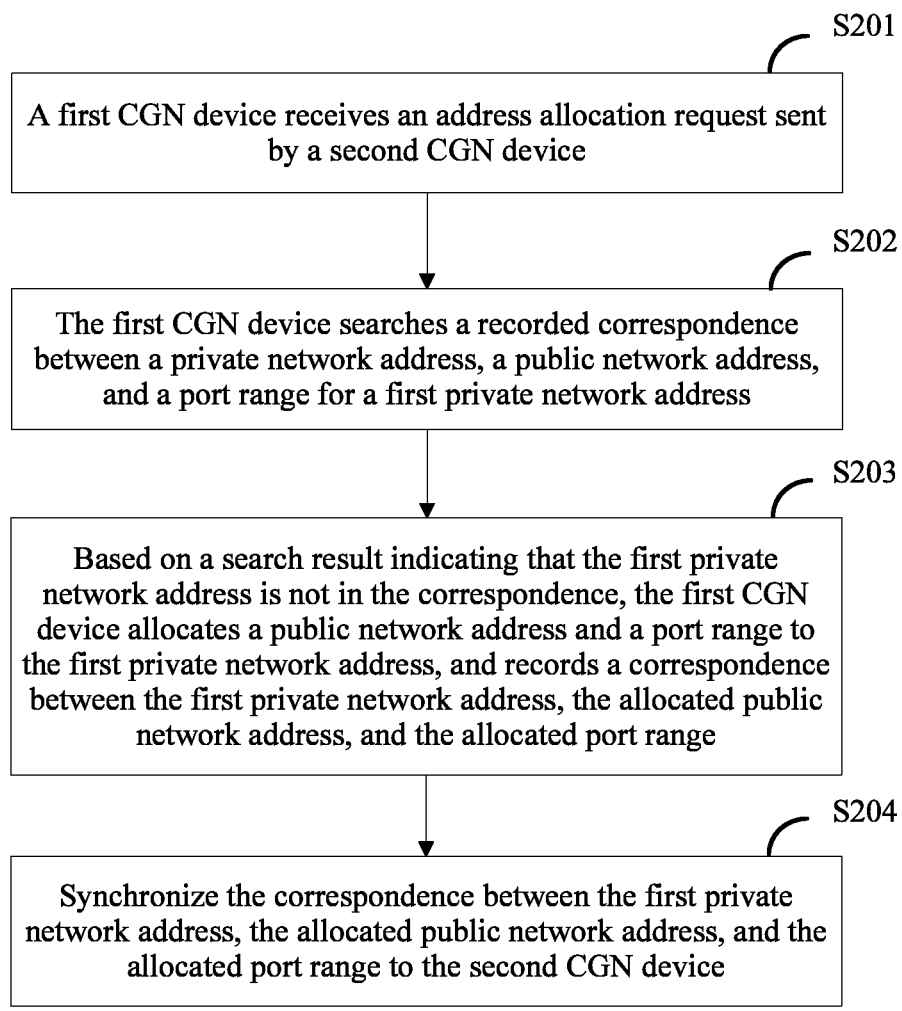
FIG. 2 is a flowchart of an address allocation method applied to a first CGN device side according to an embodiment of the present disclosure.

Based on the foregoing CGN dual-active scenario, an embodiment of the present disclosure provides an address allocation method applied to a first CGN device side. As shown in FIG. 2, the method includes the following steps.

Step S201: A first CGN device receives an address allocation request sent by a second CGN device.

The address allocation request carries a first private network address.

Step S202: The first CGN device searches a recorded correspondence between a private network address, a public network address, and a port range for the first private network address, where the first private network address is received in step S201.

Step S203: Based on a search result indicating that the first private network address is not in the correspondence, the first CGN device allocates a public network address and a port range to the first private network address, and records a correspondence between the first private network address, the allocated public network address, and the allocated port range.

Step S204: Synchronize the correspondence between the first private network address, the allocated public network address, and the allocated port range to the second CGN device.

Figure 3:
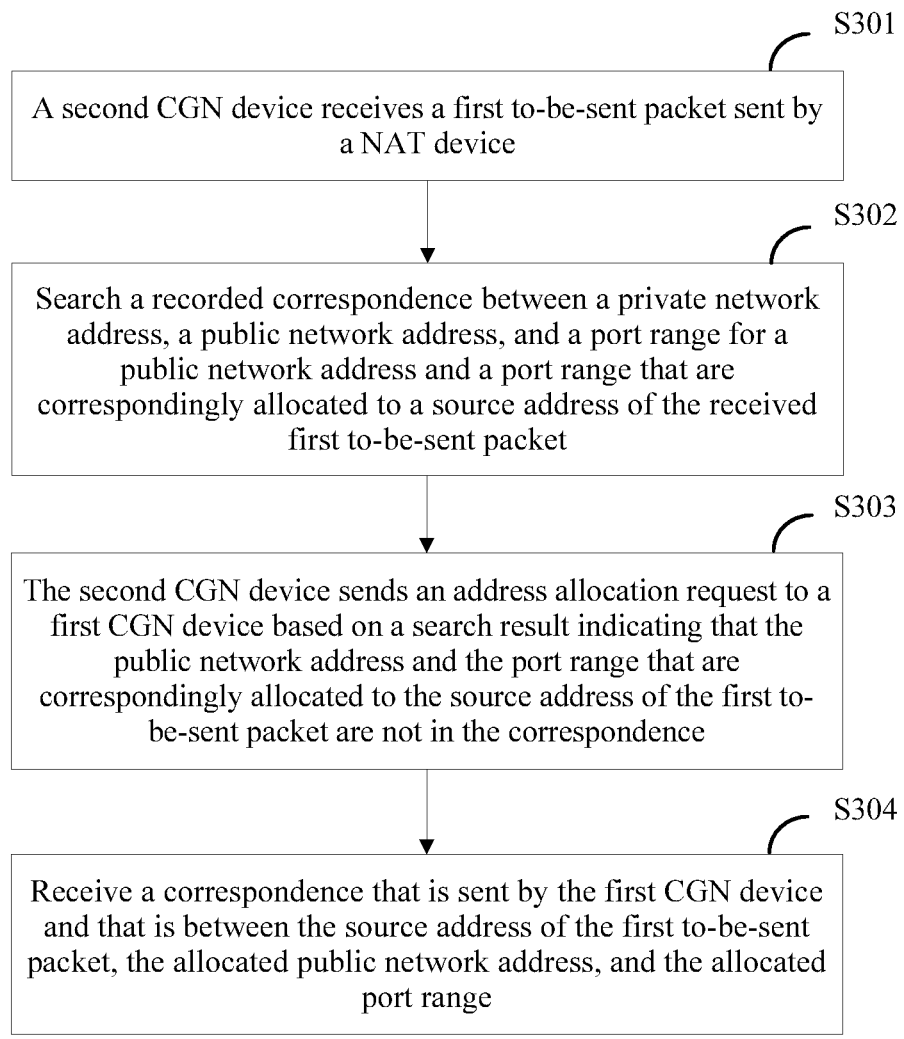
FIG. 3 is a flowchart of an address allocation method applied to a second CGN device side according to an embodiment of the present disclosure.

Corresponding to the method shown in FIG. 2, an embodiment of the present disclosure further provides an address allocation method applied to a second CGN device side. As shown in FIG. 3, the method includes the following steps.

Step S301: A second CGN device receives a first to-be-sent packet sent by a NAT device.

Step S302: Search a recorded correspondence between a private network address, a public network address, and a port range for a public network address and a port range that are correspondingly allocated to a source address of the received first to-be-sent packet.

Step S303: The second CGN device sends an address allocation request to the first CGN device based on a search result indicating that the public network address and the port range that are correspondingly allocated to the source address of the first to-be-sent packet are not in the correspondence.

The address allocation request requests the public network address and the port range that are correspondingly allocated to the source address of the first to-be-sent packet.

Step S304: Receive a correspondence that is sent by the first CGN device and that is between the source address of the first to-be-sent packet, the allocated public network address, and the allocated port range.

It should be noted that a triggering occasion of an address allocation process of a CGN device in this embodiment of this application, such as an address allocation process shown in steps S301 to S304, is similar to a triggering occasion of an address allocation process. The address allocation process is performed only after it is determined, after a to-be-sent packet is received and according to a session table that records a 5-tuple: <source address, source port, destination address, destination port, protocol type> of an established session, that the packet is an initial packet of a new session.

Further, the first CGN device is a device that is preset in a CGN dual-active scenario and that is configured to allocate a public network address and a port range to a private network address, and the second CGN device is a device that is preset in a CGN dual-active scenario and that is not configured to allocate a public network address and a port range to a private network address. The second CGN device only maps, onto a private network address to which a public network address and a port range have already been allocated, the allocated public network address and a port number that is not used in the allocated port range. As shown in FIG. 1, in the address allocation method, a CGN device A and a CGN device B are not different in terms of functionality, and both have a function of allocating a public network address and a port range to a private network address. According to the address allocation method provided in this embodiment of the present disclosure, when the CGN device A is a device configured to allocate a public network address and a port range to a private network address, and the CGN device B is not a device configured to allocate a public network address and a port range to a private network address, the CGN device A may be used as the first CGN device provided in this embodiment of the present disclosure, and the CGN device B may be used as the second CGN device provided in this embodiment of the present disclosure. When the CGN device B is a device configured to allocate a public network address and a port range to a private network address, and the CGN device A is not a device configured to allocate a public network address and a port range to a private network address, the CGN device B may be used as the first CGN device provided in this embodiment of the present disclosure, and the CGN device A may be used as the second CGN device provided in this embodiment of the present disclosure. That is, according to the address allocation method provided in this embodiment of the present disclosure, in the CGN device A and the CGN device B, only a CGN device used as the first CGN device can allocate a public network address and a port range to a private network address. In this way, the CGN device A and the CGN device B do not allocate different public network addresses or different port ranges to a same private network address such that a source tracing consistency requirement is met and no resource is wasted.

The following describes in detail, with reference to accompanying drawings and using specific embodiments, a method and a related device that are provided in the present disclosure.

Embodiment 1

Figure 4A:
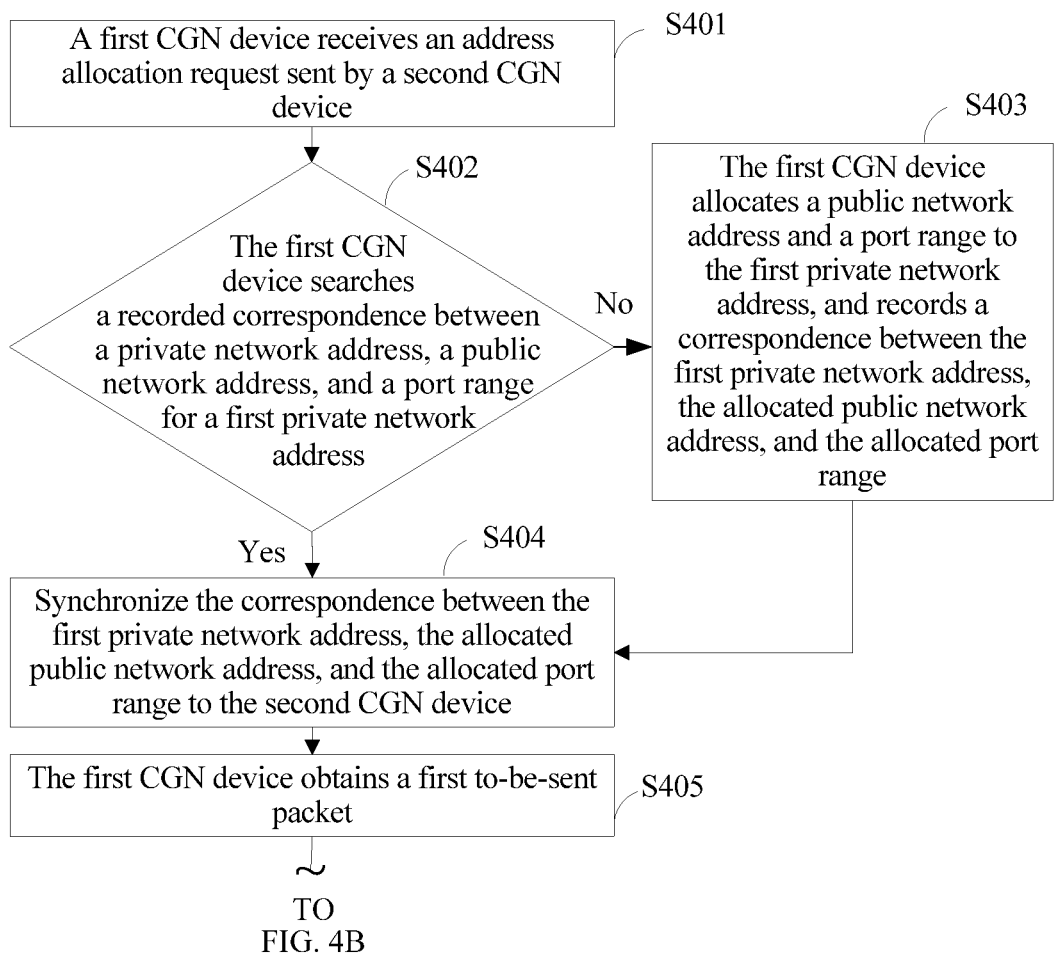
FIG. 4A and FIG. 4B are a flowchart of an address allocation method applied to a first CGN device side according to Embodiment 1 of the present disclosure.
Figure 4B:
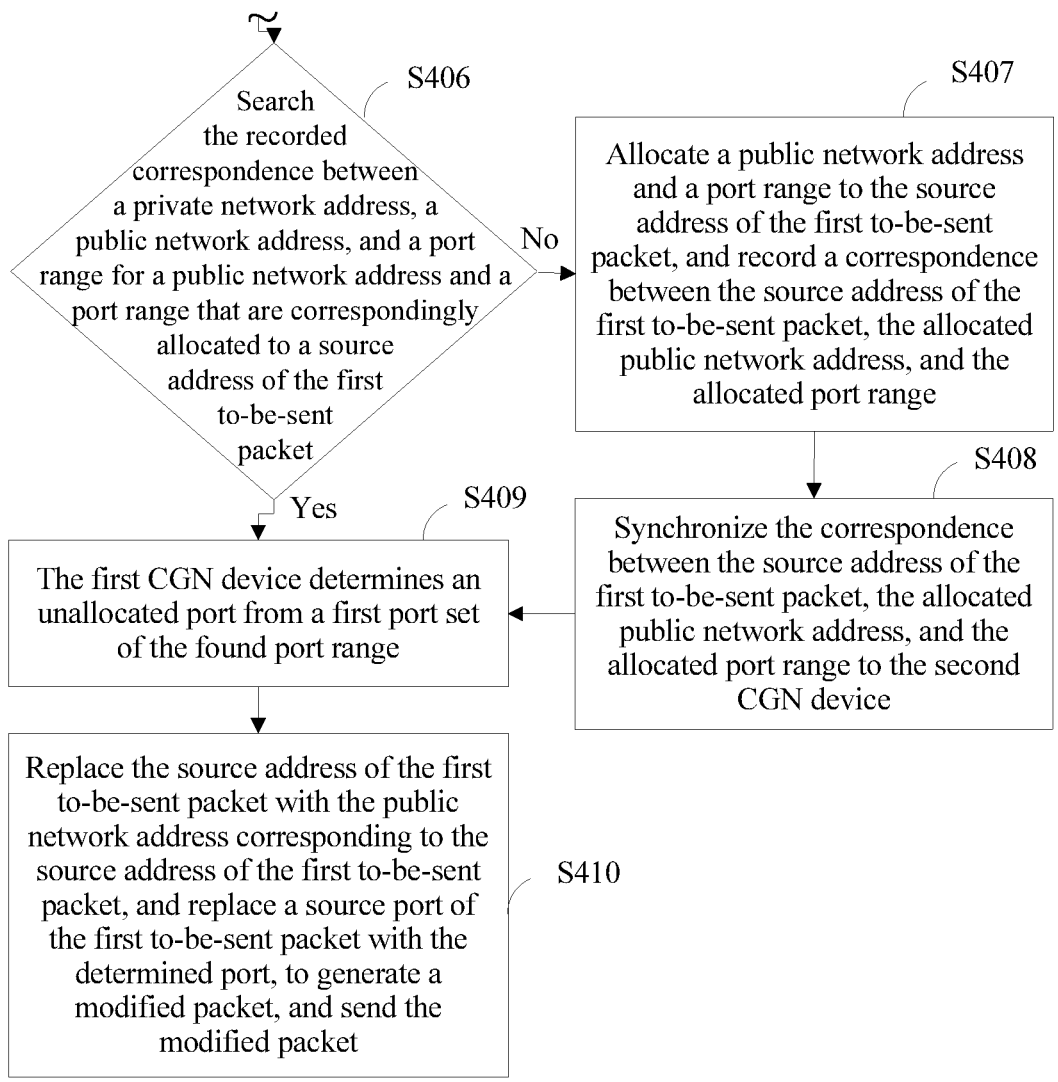

In Embodiment 1 of the present disclosure, an address allocation method applied to a first CGN device side is provided. In Embodiment 1, a first CGN device and a second CGN device each have a port set used to map a port onto a private network address, where the port set of the first CGN device is different from the port set of the second CGN device, and the port set is determined in a pre-dividing manner. As shown in FIG. 4A and FIG. 4B, the method further includes the following steps.

Step S401: A first CGN device receives an address allocation request sent by a second CGN device, where the address allocation request carries a first private network address.

Step S402: The first CGN device searches a recorded correspondence between a private network address, a public network address, and a port range for the first private network address, and if the first private network address is in the correspondence, performs step S404, or if the first private network address is not in the correspondence, performs step S403.

Further, the correspondence between a private network address, a public network address, and a port range may be recorded in a user table. In this step, the user table may be searched for the first private network address.

Step S403: The first CGN device allocates a public network address and a port range to the first private network address, and records a correspondence between the first private network address, the allocated public network address, and the allocated port range.

Further, this step is performed based on a search result indicating that the first private network address is not found in the correspondence between a private network address, a public network address, and a port range, and the correspondence between the first private network address, the allocated public network address, and the allocated port range may be recorded in the user table.

Further, when the first CGN device receives a packet that is sent by a NAT device (which may be a device that translates a first-layer IP address using a NAT44 technology, for example, a CPE device) and whose source address is a private network address, steps similar to steps S401 to S403 are performed and include searching a recorded correspondence between a private network address, a public network address, and a port range for the source address, allocating a public network address and a port range to the source address based on a search result indicating that the source address is not in the correspondence, and recording a correspondence between the source address, the allocated public network address, and the allocated port range, and synchronizing the correspondence between the source address, the corresponding allocated public network address, and the allocated port range to the second CGN device.

Step S404: Synchronize the correspondence between the first private network address, the allocated public network address, and the allocated port range to the second CGN device.

Further, in this step, the allocated public network address and the allocated port range may be synchronized to the second CGN device according to a preset synchronization rule. For example, a public network address and a port range may be synchronized to the second CGN device after being allocated to each private network address, or public network addresses and port ranges may be synchronized to the second CGN device after being allocated to a preset quantity of private network addresses, or according to a preset synchronization period, a public network address and a port range that are allocated in this period and a corresponding private network address may be synchronized to the second CGN device when a synchronization period arrives.

Step S405: The first CGN device obtains a first to-be-sent packet.

Further, in this step, the first CGN device may obtain the first to-be-sent packet using the NAT device. That is, the NAT device may send the first to-be-sent packet to the first CGN device.

Step S406: Search the recorded correspondence between a private network address, a public network address, and a port range for a public network address and a port range that are correspondingly allocated to a source address of the first to-be-sent packet, and if the public network address and the port range are in the correspondence, perform step S409, or if the public network address and the port range are not in the correspondence, perform step S407.

Step S407: Allocate a public network address and a port range to the source address of the first to-be-sent packet, and record a correspondence between the source address of the first to-be-sent packet, the allocated public network address, and the allocated port range.

Step S408: Synchronize the correspondence between the source address of the first to-be-sent packet, the allocated public network address, and the allocated port range to the second CGN device.

Step S409: The first CGN device determines an unallocated port from a first port set of the found port range.

The port range is divided into the first port set and a second port set according to a preset division rule, the first port set is a port set that is used by the first CGN device to allocate ports, the second port set is a port set that is used by the second CGN device to allocate ports, and a port identifier in the first port set is different from a port identifier in the second port set.

Further, for port ranges allocated to all private addresses, the port range needs to be divided into different port sets according to the preset division rule regardless of the port range allocated to the source address (private network address) of the packet sent by the NAT device or the port range allocated to the first private network address sent by the second CGN device. The first CGN device and the second CGN device each can perform port allocation using a port in their respective port sets.

The following use scenario exists in other approaches. It is assumed that a private IP address 1.1.1.1 has obtained a port range resource [2048, 2304] and a mapping relationship of the private IP address 1.1.1.1 is recorded in both user tables on a primary CGN device and a secondary CGN device. A data flow 1.1.1.1:80->baidu.com from a CPE device is offloaded to the primary CGN device, and the primary CGN device allocates a public IP address 10.1.1.1 and a port resource 2050 to the data flow. That is, a mapping relationship is 1.1.1.1:80[10.1.1.1:2050]->baidu.com. Before such resource allocation information is synchronized to the secondary CGN device, another data flow 1.1.1.190->baidu.com is offloaded to the secondary CGN device, and the secondary CGN device may also allocate, to the data flow, a resource that is the same as the resource allocated by the primary CGN device, that is, the public IP address 10.1.1.1 and the port resource 2050. Therefore, an obtained mapping relationship is 1.1.1.1:90[10.1.1.1:2050]->baidu.com.

In the foregoing use scenario, there may be same public network addresses and same ports such that disorder occurs when a backhauled packet is translated into a private IP address. That is, when a packet whose destination address is 10.1.1.1:2050 is received, whether the packet is forwarded to 1.1.1.1:80 or 1.1.1.1:90 cannot be determined, and the backhauled packet cannot be forwarded correctly. According to the address allocation method provided in this embodiment of the present disclosure, a port range allocated to a private address is divided, according to a preset division rule, into different port sets that are separately used by the first CGN device and the second CGN device to allocate ports. In this way, the first CGN device and the second CGN device do not map a same public network address or a same port onto private network addresses, and a backhauled packet is forwarded correctly.

Further, the preset division rule may be set according to actual situations, and both the first CGN device and the second CGN device preset the preset division rule such that both the first CGN device and the second CGN device are aware of their respective corresponding parts in the port range. For example, the port range may be divided into two parts with consecutive port numbers. The former part is used by the first CGN device for allocation, and the latter part is used by the second CGN device for allocation, or the latter part is used by the first CGN device for allocation, and the former part is used by the second CGN device for allocation. For example, for a port range [2049, 2304], [2049, 2177] is used by the first CGN device for allocation, and [2178, 2304] is used by the second CGN device for allocation. Alternatively, a port with an odd port number in the port range is used by the first CGN device for allocation, and a port with an even port number is used by the second CGN device for allocation, a port with an even port number in the port range is used by the first CGN device for allocation, and a port with an odd port number is used by the second CGN device for allocation, or the like.

Step S410: Replace the source address of the first to-be-sent packet with the public network address corresponding to the source address of the first to-be-sent packet, and replace a source port of the first to-be-sent packet with the determined port, to generate a modified packet, and send the modified packet.

Further, based on a result indicating that the source address of the first to-be-sent packet is in the foregoing correspondence, a port range corresponding to the source address of the first to-be-sent packet may be the found port range, and a public network address corresponding to the source address of the first to-be-sent packet may be the found public network address. Based on a result indicating that the source address of the first to-be-sent packet is not in the foregoing correspondence, a port range corresponding to the source address of the first to-be-sent packet may be the allocated port range, and a public network address corresponding to the source address of the first to-be-sent packet may be the allocated public network address.

An execution sequence of steps S401 to S404 and steps S405 to S410 is not limited, and an execution sequence of steps S407 to S408 and steps S409 to S410 is not limited.

Embodiment 2

Figure 5:
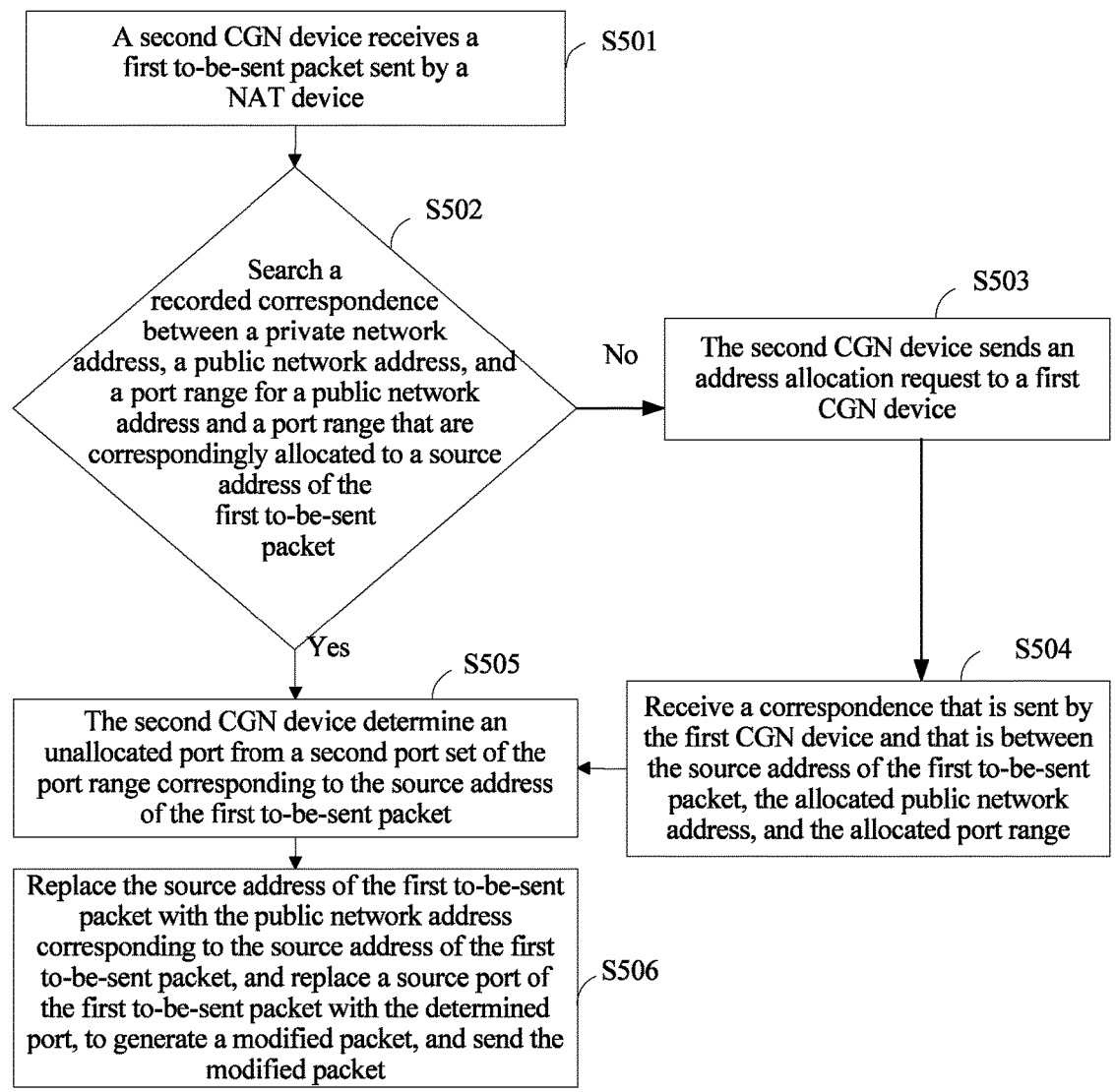
FIG. 5 is a flowchart of an address allocation method applied to a second CGN device side according to Embodiment 2 of the present disclosure.

Corresponding to Embodiment 1, in Embodiment 2 of the present disclosure, an address allocation method applied to a second CGN device side is provided. In Embodiment 2, as shown in FIG. 5, the method further includes the following steps.

Step S501: A second CGN device receives a first to-be-sent packet sent by a NAT device.

Step S502: Search a recorded correspondence between a private network address, a public network address, and a port range for a public network address and a port range that are correspondingly allocated to a source address of the first to-be-sent packet, and perform step S503 if the public network address and the port range are not in the correspondence, or perform step S505 if the public network address and the port range are in the correspondence.

Step S503: The second CGN device sends an address allocation request to a first CGN device.

The address allocation request requests the public network address and the port range that are correspondingly allocated to the source address of the first to-be-sent packet.

Further, in this step, when the second CGN device does not find the public network address or the port range that corresponds to the source address of the first to-be-sent packet, a possible reason is that the first CGN device has allocated a public network address and a port range to the source address of the first to-be-sent packet but has not synchronized the public network address or the port range to the second CGN device, or a possible reason is that the first CGN device has not allocated a public network address or a port range to the source address of the first to-be-sent packet. Because the second CGN device cannot allocate a public network address or a port range to a private network address, the second CGN device needs to send the address allocation request to the first CGN device. If the first CGN device has allocated a public network address and a port range to the private network address but has not synchronized the public network address or the port range to the second CGN device, the first CGN device may synchronize the allocated public network address and the allocated port range to the second CGN device. If the first CGN device has not allocated a public network address or a port range to the private network address, the first CGN device allocates a public network address and a port range to the private network address, and synchronizes the allocated public network address and the allocated port range to the second CGN device.

The following use scenario exists in some other approaches. It is assumed that a length of a pre-allocated port range is 256, that is, ports are pre-allocated into the following port range forms: [2049, 2304], [2305, 2561], . . . , [65279, 65535]. It is assumed that a data flow 192.1.1.2:80->sina.com from CPE 1 is offloaded to a CGN device A, and a private IP address 192.1.1.2 is not found in a user table of the CGN device A. That is, it is the first time the private IP address is online, and the private IP address has been allocated with no public IP address and port range. The CGN device A may allocate a public IP address 10.1.1.1 and a public network port range [1029, 2304] to the private IP address. After the CGN device A allocates this port range resource to the private IP address, information about the just allocated resource has not been synchronized to a CGN device B. In this case, the CGN device B may receive a packet 192.1.1.2:90->sohu.com from CPE 2. Because it is also the first time 192.168.1.1.2 logs in to the CGN device B, the private IP address 192.1.1.2 is not found in a user table of the CGN device B either, and the CGN device B also needs to allocate a public network address and a port range resource to this private IP address. The CGN device B may allocate a public IP address 10.1.1.2 and a public network port range [2305, 2561] to the private IP address.

In the foregoing use scenario, the private IP address 192.1.1.2 obtains two different public IP addresses and two different port range resources such that source tracing consistency cannot be ensured. In addition, in the foregoing use scenario, public network address resources and port resources are wasted. According to the address allocation method provided in this embodiment of the present disclosure, in the CGN device A and the CGN device B, only a CGN device used as the first CGN device can allocate a public network address and a port range to a private network address. When a CGN device used as the second CGN device receives a packet that uses a private network address as a source address, and does not find, in a locally stored user table, a public network address or a port range that is allocated to the private network address, the CGN device used as the second CGN device may send an address allocation request to the first CGN device in order to request the first CGN device to allocate a public network address and a port range to the private network address, and synchronize the allocated public network address and the allocated port range to the second CGN device. Therefore, a same private network address is not allocated with different public network addresses and different port ranges, a source tracing consistency requirement is met, and no resource is wasted.

Step S504: Receive a correspondence that is sent by the first CGN device and that is between the source address of the first to-be-sent packet, the allocated public network address, and the allocated port range.

Step S505: The second CGN device determines an unallocated port from a second port set of the port range corresponding to the source address of the first to-be-sent packet.

Further, the second CGN device does not allocate a public network address or a port range to a private network address in a CGN dual-active scenario, but needs to map a public network address onto a source address (private network address) of a received packet, and map a port in an allocated port set onto a source port of the received packet.

Step S506: Replace the source address of the first to-be-sent packet with the public network address corresponding to the source address of the first to-be-sent packet, and replace a source port of the first to-be-sent packet with the determined port, to generate a modified packet, and send the modified packet.

Further, in this embodiment, after the first CGN device receives a packet sent by the NAT device and allocates a public network address and a port range to a source address of the packet, the method further includes receiving, by the second CGN device, the private address, the corresponding public network address, and the corresponding port range that are sent by the first CGN device, where the second CGN device can determine, according to a preset division rule, a second port set that is in the port range and that is used by the second CGN device for allocation.

Embodiment 3

Figure 6A:
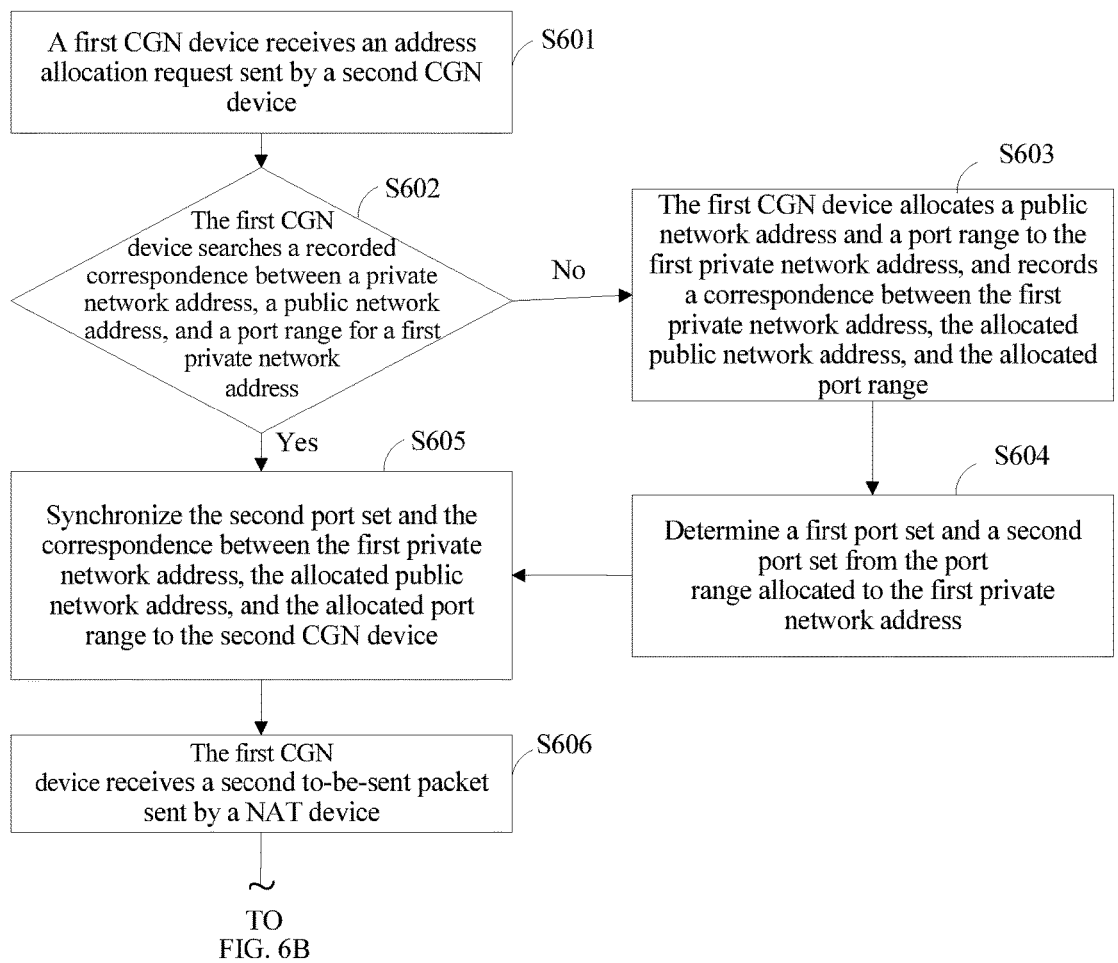
FIG. 6A and FIG. 6B are a flowchart of an address allocation method applied to a first CGN device side according to Embodiment 3 of the present disclosure.
Figure 6B:
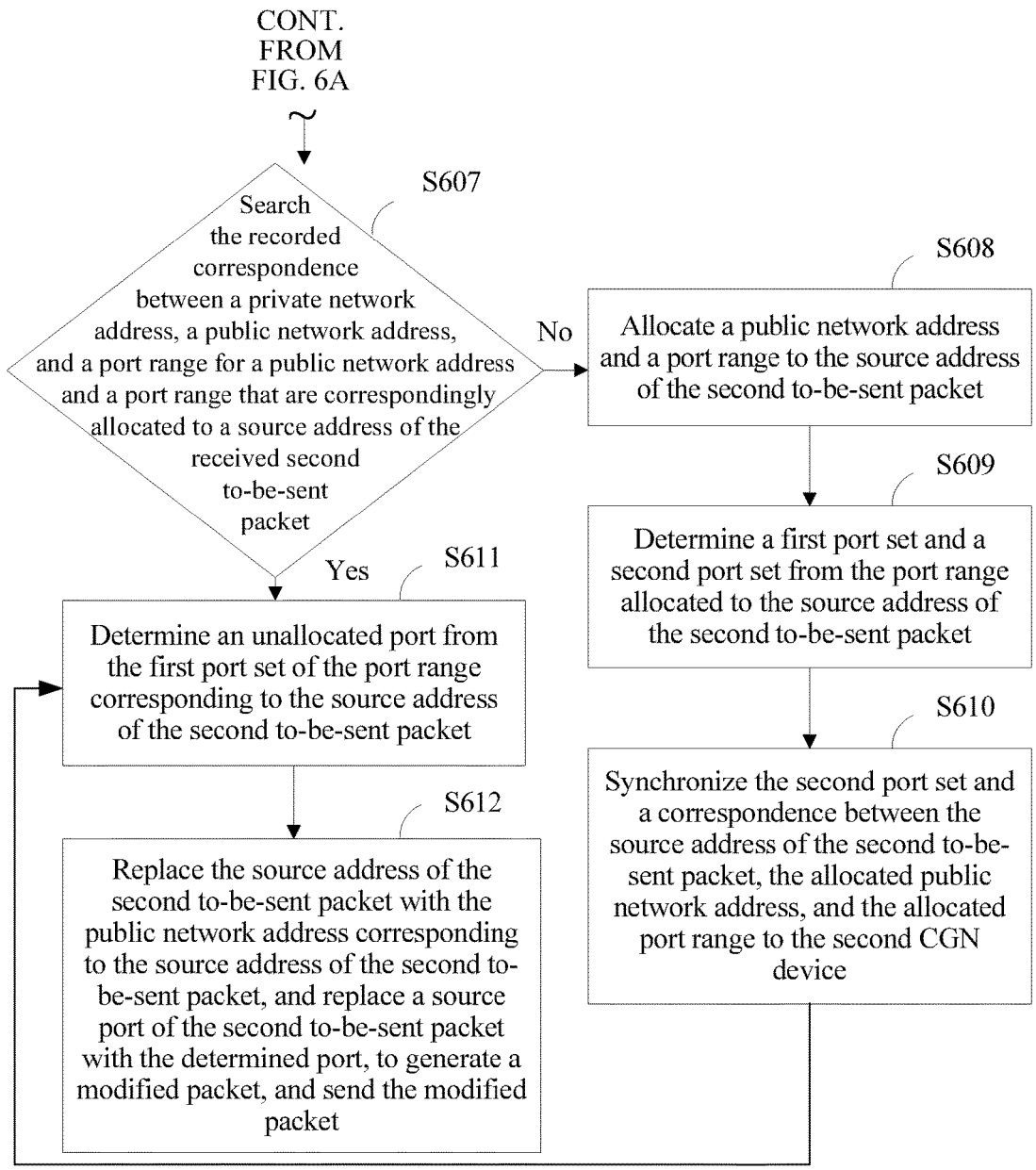

In Embodiment 3 of the present disclosure, an address allocation method applied to a first CGN device side is provided. In Embodiment 3, a first CGN device and a second CGN device each have a port set used to map a port onto a private network address, where the port set of the first CGN device is different from the port set of the second CGN device, and the port set is determined by the first CGN device. As shown in FIG. 6A and FIG. 6B, the method further includes the following steps.

Step S601: The first CGN device receives an address allocation request sent by the second CGN device.

The address allocation request carries a first private network address.

Step S602: The first CGN device searches a recorded correspondence between a private network address, a public network address, and a port range for a first private network address, and performs step S605 if the first private network address is in the correspondence, or performs step S603 if the first private network address is not in the correspondence.

Step S603: The first CGN device allocates a public network address and a port range to the first private network address, and records a correspondence between the first private network address, the allocated public network address, and the allocated port range.

Step S604: Determine a first port set and a second port set from the port range allocated to the first private network address.

The first port set is a port set that is used by the first CGN device to allocate ports, the second port set is a port set that is used by the second CGN device to allocate ports, and a port identifier in the first port set is different from a port identifier in the second port set.

Step S605: Synchronize the second port set and the correspondence between the first private network address, the allocated public network address, and the allocated port range to the second CGN device.

Step S606: The first CGN device receives a second to-be-sent packet sent by a NAT device.

Step S607: Search the recorded correspondence between a private network address, a public network address, and a port range for a public network address and a port range that are correspondingly allocated to a source address of the received second to-be-sent packet, and perform step S611 if the public network address and the port range are in the correspondence, or perform step S608 if the public network address and the port range are not in the correspondence.

Step S608: Allocate a public network address and a port range to the source address of the second to-be-sent packet.

Step S609: Determine a first port set and a second port set from the port range allocated to the source address of the second to-be-sent packet.

Step S610: Synchronize the second port set and a correspondence between the source address of the second to-be-sent packet, the allocated public network address, and the allocated port range to the second CGN device.

Further, for port ranges allocated to all private addresses, the port range needs to be divided into different port sets according to a preset division rule regardless of the port range allocated to the source address (private network address) of the packet sent by the NAT device or the port range allocated to a to-be-allocated private network address sent by the second CGN device. The first CGN device and the second CGN device each can perform port allocation using a port in a corresponding port set.

Further, the first CGN device may divide the port range into different port sets according to the preset division rule, and send, to the second CGN device, a port set allocated to the second CGN device. For example, the port range may be divided into two parts with consecutive port numbers. The former part is used by the first CGN device for allocation, and the latter part is used by the second CGN device for allocation, or the latter part is used by the first CGN device for allocation, and the former part is used by the second CGN device for allocation. For example, for a port range [2049, 2304], [2049, 2177] is used by the first CGN device for allocation, and [2178, 2304] is used by the second CGN device for allocation. Alternatively, a port with an odd port number in the port range is used by the first CGN device for allocation, and a port with an even port number is used by the second CGN device for allocation, a port with an even port number in the port range is used by the first CGN device for allocation, and a port with an odd port number is used by the second CGN device for allocation, or the like. Specific manners for determining a port set are not enumerated one by one herein, and any manner is appropriate provided that port sets are different.

Further, in step S605 and step S608, the port sets that are determined by the first CGN device and that are used by the second CGN device for mapping, the allocated public network addresses, and the allocated port ranges may be synchronized to the second CGN device according to a preset synchronization rule. For example, a public network address and a port range may be synchronized to the second CGN device after being allocated to each to-be-allocated private network address, or public network addresses and port ranges may be synchronized to the second CGN device after being allocated to a preset quantity of private network addresses, or according to a preset synchronization period, a public network address and a port range that are allocated in this period and a corresponding private network address may be synchronized to the second CGN device when a synchronization period arrives. That is, the synchronization in step S605 and the synchronization in step S608 may be completed in two synchronization processes, or may be completed in one synchronization process.

Further, an execution sequence of steps S601 to S605 and steps S606 to S608 is not limited.

Step S611: Determine an unallocated port from the first port set of the port range corresponding to the source address of the second to-be-sent packet.

Step S612: Replace the source address of the second to-be-sent packet with the public network address corresponding to the source address of the second to-be-sent packet, and replace a source port of the second to-be-sent packet with the determined port, to generate a modified packet, and send the modified packet.

Further, based on a result indicating that the source address of the second to-be-sent packet is in the foregoing correspondence, a port range corresponding to the source address of the second to-be-sent packet may be the found port range, and a public network address corresponding to the source address of the second to-be-sent packet may be the found public network address. Based on a result indicating that the source address of the second to-be-sent packet is not in the foregoing correspondence, a port range corresponding to the source address of the second to-be-sent packet may be the allocated port range, and a public network address corresponding to the source address of the second to-be-sent packet may be the allocated public network address.

Further, an execution sequence of steps S601 to S605 and steps S606 to S612 is not limited, and an execution sequence of steps S608 to S610 and steps S611 to S612 is not limited.

Embodiment 4

Figure 7:
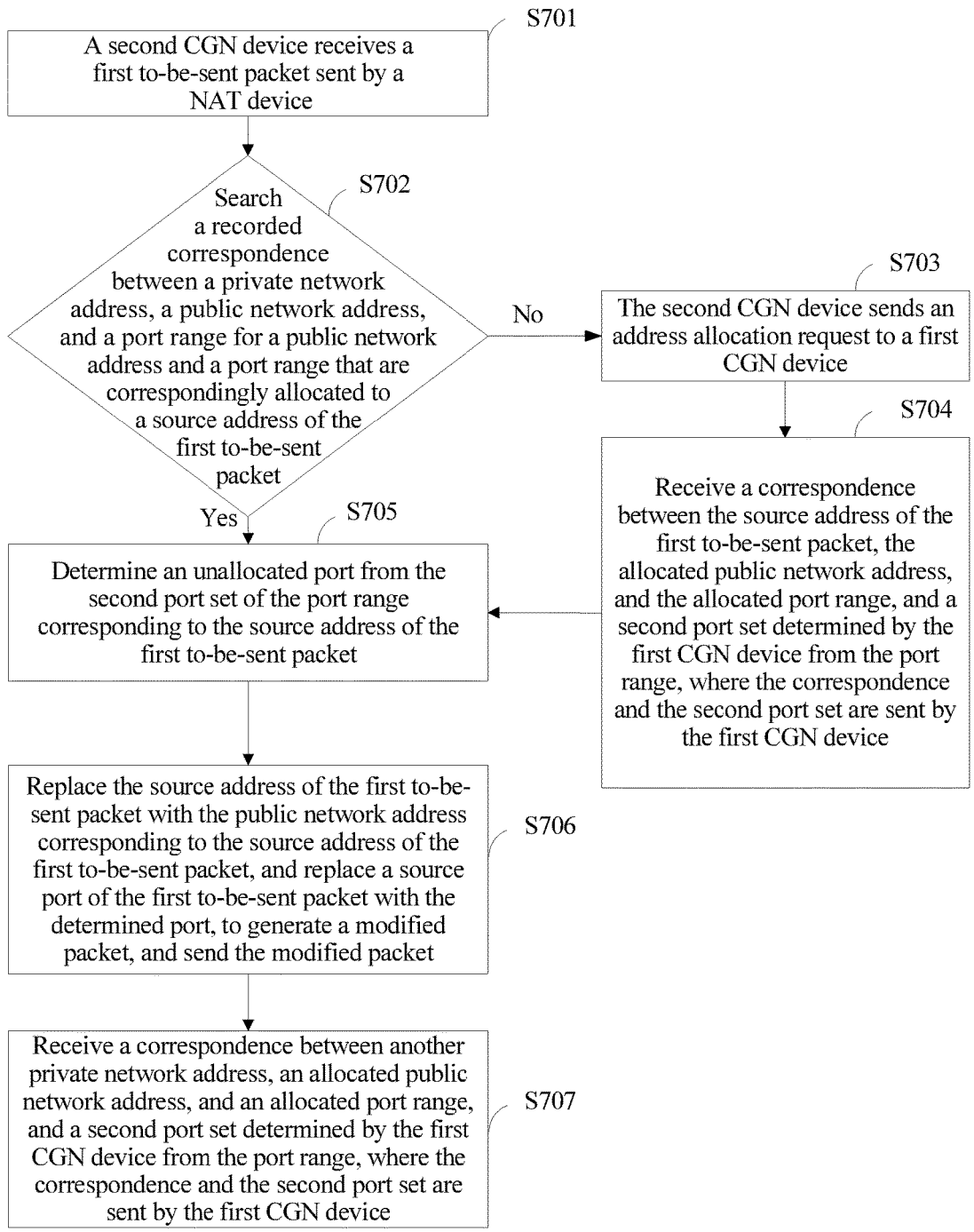
FIG. 7 is a flowchart of an address allocation method applied to a second CGN device side according to Embodiment 4 of the present disclosure.

Corresponding to Embodiment 3, in Embodiment 4 of the present disclosure, an address allocation method applied to a second CGN device side is provided. In Embodiment 4, as shown in FIG. 7, the method further includes the following steps.

Step S701: A second CGN device receives a first to-be-sent packet sent by a NAT device.

Step S702: Search a recorded correspondence between a private network address, a public network address, and a port range for a public network address and a port range that are correspondingly allocated to a source address of the first to-be-sent packet, and perform step S703 if the public network address and the port range are not in the correspondence, or perform step S705 if the public network address and the port range are in the correspondence.

Step S703: The second CGN device sends an address allocation request to a first CGN device.

The address allocation request requests the public network address and the port range that are correspondingly allocated to the source address of the first to-be-sent packet.

Step S704: Receive a correspondence between the source address of the first to-be-sent packet, the allocated public network address, and the allocated port range, and a second port set determined by the first CGN device from the port range, where the correspondence and the second port set are sent by the first CGN device.

The first CGN device divides the port range into a first port set and the second port set, the first port set is a port set that is used by the first CGN device to allocate ports, the second port set is a port set that is used by the second CGN device to allocate ports, and a port identifier in the first port set is different from a port identifier in the second port set.

Step S705: Determine an unallocated port from the second port set of the port range corresponding to the source address of the first to-be-sent packet.

Step S706: Replace the source address of the first to-be-sent packet with the public network address corresponding to the source address of the first to-be-sent packet, and replace a source port of the first to-be-sent packet with the determined port, to generate a modified packet, and send the modified packet.

Step S707: Receive a correspondence between another private network address, an allocated public network address, and an allocated port range, and a second port set determined by the first CGN device from the port range, where the correspondence and the second port set are sent by the first CGN device.

The other private network address is a source address of a packet sent by the NAT device and received by the first CGN device.

Further, in step S704 and step S707, the first CGN device may synchronize, to the second CGN device according to a preset synchronization rule, the allocated public network address, the allocated port range, and the port set that is determined by the first CGN device and that is used by the second CGN device for mapping. Therefore, a receiving step in step S704 and a receiving step in step S707 may be completed in two synchronization processes, or may be completed in one synchronization process.

Further, an execution sequence of steps S701 to S706 and step S707 is not limited.

Figure 8:
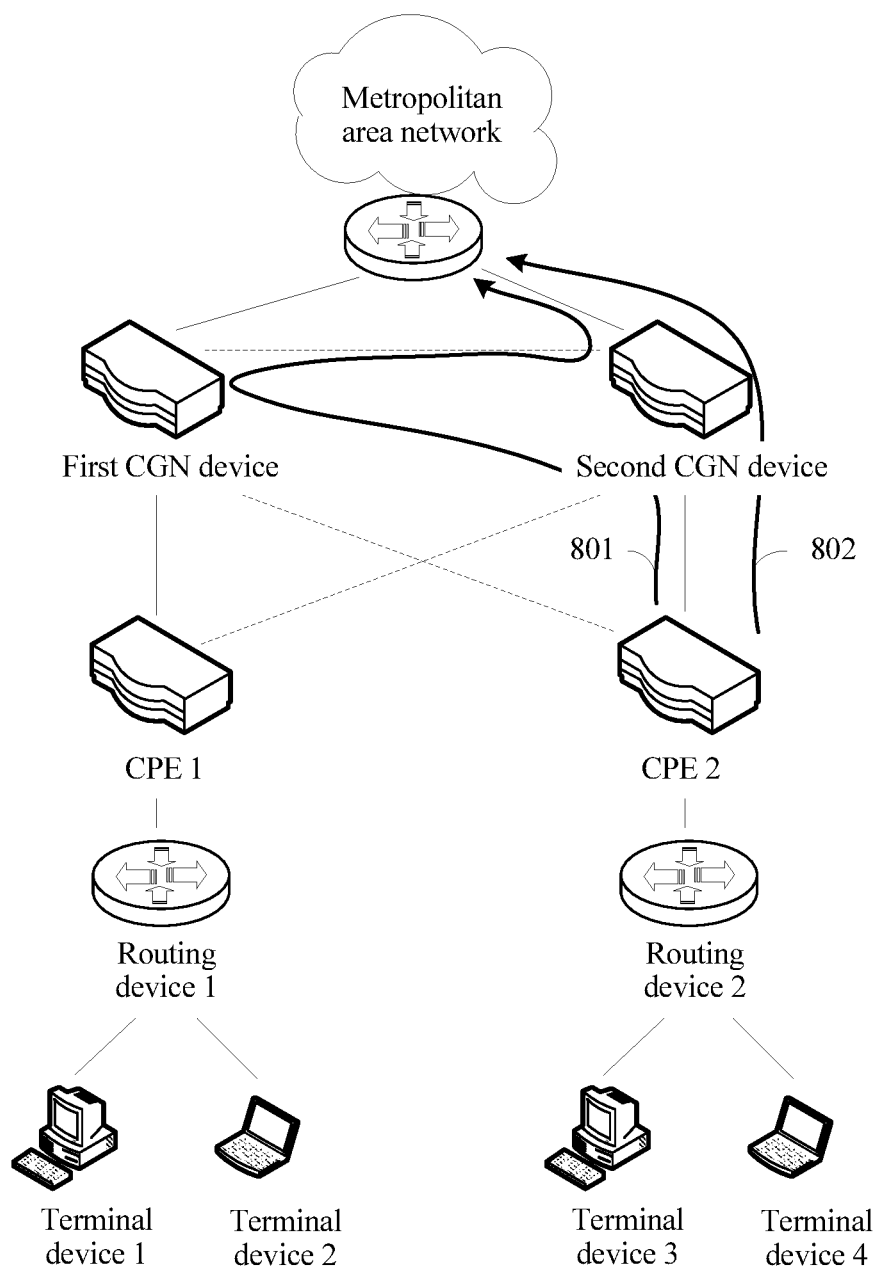
FIG. 8 is a schematic diagram of a data flow of an address allocation method according to an embodiment of the present disclosure.

Further, FIG. 8 is a schematic diagram of a data flow of an address allocation method according to an embodiment of the present disclosure. As shown in FIG. 8, a data flow 801 indicates that when a second CGN device receives a packet whose source address is a private network address, and if a public network address and a port range that are allocated to the private network address are not found, the second CGN device sends an address allocation request to a first CGN device, and after receiving the public network address and the port range that are sent by the first CGN device and are corresponding to the private network address, the second CGN device records a correspondence between the private network address, the public network address corresponding to the private network address, and the port range corresponding to the private network address, determines a port mapped onto the packet this time, and forwards the packet. A data flow 802 indicates that when subsequently receiving a packet whose source address is the private network address, the second CGN device can search a record on the second CGN device for a public network address and a port range that are corresponding to the private network address, and forward the packet, and does not need to send an address allocation request to the first CGN device again. In this way, a same private network address is not allocated with different public network addresses and different port ranges, thereby ensuring source tracing consistency and avoiding waste of public network address resources and port resources.

Figure 9:
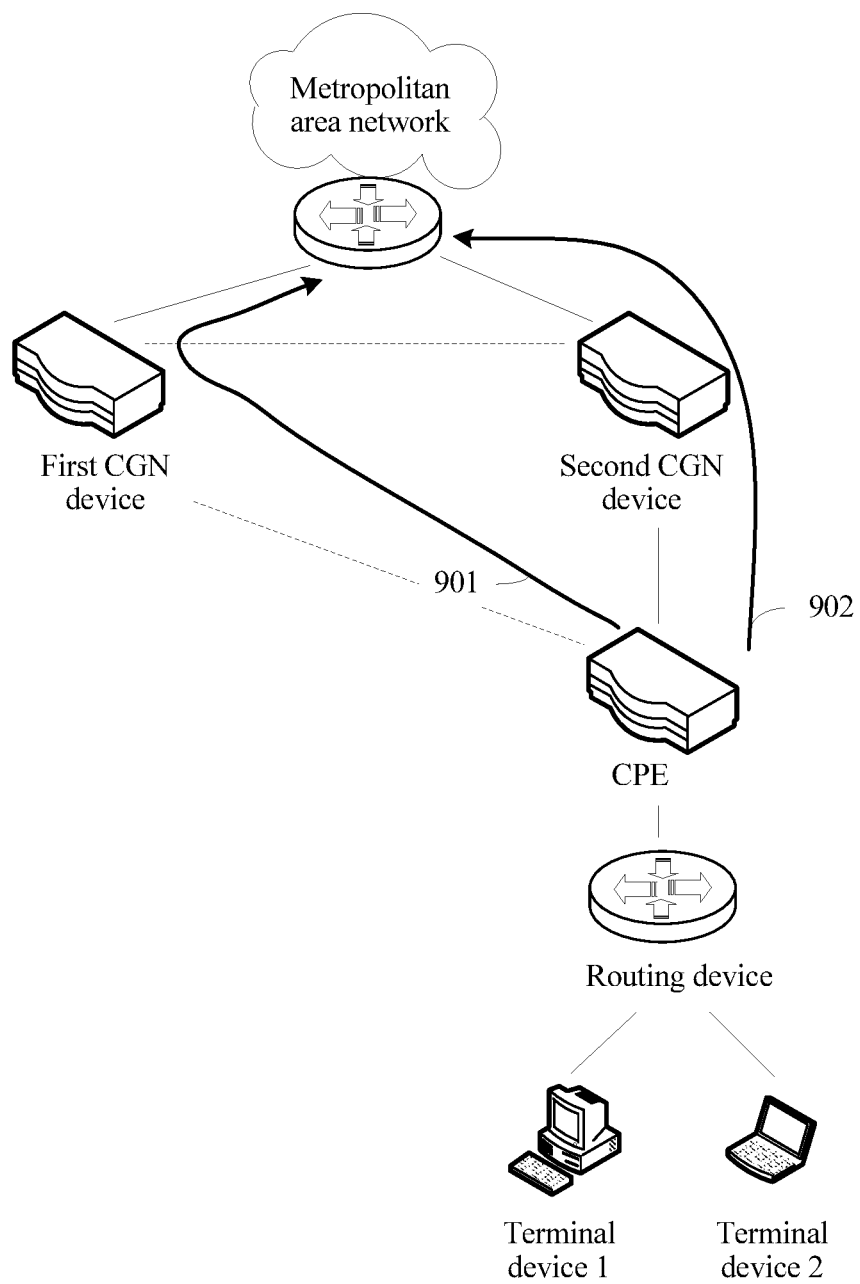
FIG. 9 is another schematic diagram of a data flow of an address allocation method according to an embodiment of the present disclosure.

Further, FIG. 9 is another schematic diagram of a data flow of an address allocation method according to an embodiment of the present disclosure. As shown in FIG. 9, a data flow 901 indicates that after receiving a packet whose source address is a private network address (for example, 192.168.0.1), a first CGN device determines, from a port set (for example, [2049, 2176]) that is used by the first CGN device for mapping, a port mapped onto the packet, where the port is determined according to a recorded public network address and a recorded port range that are corresponding to the private network address and according to the port set. A data flow 902 indicates that after receiving a packet whose source address is the same private network address (for example, 192.168.0.1), a second CGN device determines, from a port set (for example, [2177, 2304]) that is used by the second CGN device for mapping, a port mapped onto the packet, where the port is determined according to a recorded public network address and a recorded port range that are corresponding to the private network address and according to the port set. In this way, the first CGN device and the second CGN device do not map a same public network address or a same port onto private network addresses, and a backhauled packet is forwarded correctly.

Based on a same disclosure conception, the embodiments of the present disclosure further provide a CGN device and a CGN dual-active system. Because principles of resolving a problem by the device and the system are similar to those of the foregoing address allocation method. Therefore, for implementation of the device and the system, reference may be made to implementation of the foregoing method, and repeated parts are not described herein.

Figure 10:
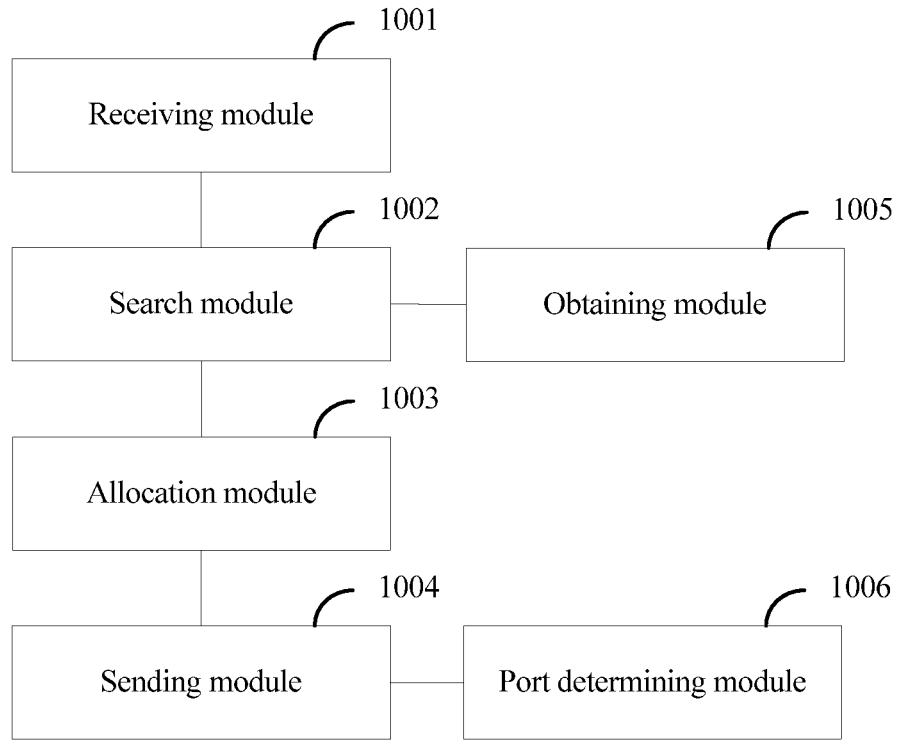
FIG. 10 is a schematic structural diagram of a CGN device according to an embodiment of the present disclosure.

A CGN device provided in an embodiment of the present disclosure is configured to perform functions of the first CGN device described in the foregoing method embodiments. For an application scenario of the CGN device, a connection relationship with other devices such as a second CGN device and a NAT device, and a packet exchanging procedure, reference may be made to descriptions in the foregoing method embodiments. As shown in FIG. 10, the CGN device includes the following modules a receiving module 1001 configured to receive an address allocation request sent by a second CGN device, where the address allocation request carries a first private network address, a search module 1002 configured to search a recorded correspondence between a private network address, a public network address, and a port range for the first private network address received by the receiving module 1001, an allocation module 1003 configured to allocate a public network address and a port range to the first private network address based on a search result indicating that the first private network address is not in the correspondence, and record a correspondence between the first private network address, the allocated public network address, and the allocated port range, where the search result is obtained by the search module 1002, and a sending module 1004 configured to synchronize, to the second CGN device, the correspondence between the first private network address, the public network address allocated by the allocation module 1003, and the port range allocated by the allocation module 1003.

The CGN device is a device that is preset in a CGN dual-active scenario and that is configured to allocate a public network address and a port range to a private network address, and the second CGN device is a device that is preset in a CGN dual-active scenario and that is not configured to allocate a public network address and a port range to a private network address.

Further, for an address allocation procedure in which the receiving module 1001 receives the address allocation request sent by the second CGN device, the search module 1002 searches for the first private network address carried in the allocation request, the allocation module 1003 allocates the public network address and the port range to the first private network address according to the search result obtained by the search module 1002, and the sending module 1004 synchronizes the first private network address, the allocated public network address, and the allocated port range to the second CGN device, refer to steps S401 to S404 in Embodiment 1 of the present disclosure.

The CGN device further includes an obtaining module 1005 and a port determining module 1006.

The obtaining module 1005 is configured to obtain a first to-be-sent packet.

The search module 1002 is further configured to search the correspondence for a public network address and a port range that are correspondingly allocated to a source address of the first to-be-sent packet obtained by the obtaining module 1005.

The port determining module 1006 is configured to determine, based on a search result indicating that the public network address and the port range that are correspondingly allocated to the source address of the first to-be-sent packet are in the correspondence, an unallocated port from a first port set of the port range found by the search module 1002, where the search result is obtained by the search module 1002.

The sending module 1004 is further configured to replace the source address of the first to-be-sent packet with the public network address found by the search module 1002, and replace a source port of the first to-be-sent packet with the port determined by the port determining module 1006, to generate a modified packet, and send the modified packet.

The port range is divided into a second port set and the first port set according to a preset division rule, the first port set is a port set that is used by the CGN device to allocate ports, the second port set is a port set that is used by the second CGN device to allocate ports, and a port identifier in the first port set is different from a port identifier in the second port set.

Further, for an address allocation procedure in which the obtaining module 1005 obtains the first to-be-sent packet, the search module 1002 searches for the public network address and the port range that are corresponding to the source address of the first to-be-sent packet, the port determining module 1006 determines, from the first port set, an available port for the first to-be-sent packet according to the search result obtained by the search module 1002, and the sending module 1004 sends the modified packet with the replaced source address and source port, refer to steps S405 to S410 in Embodiment 1 of the present disclosure.

The allocation module 1003 is further configured to determine a first port set and a second port set from the port range allocated to the first private network address, where the first port set is a port set that is used by the CGN device to allocate ports, the second port set is a port set that is used by the second CGN device to allocate ports, and a port identifier in the first port set is different from a port identifier in the second port set.

The sending module 1004 is further configured to synchronize, to the second CGN device, the determined second port set and the correspondence between the first private network address, the public network address allocated by the allocation module 1003, and the port range allocated by the allocation module 1003.

Further, for an address allocation procedure in which the receiving module 1001 receives the address allocation request sent by the second CGN device, the search module 1002 searches for the first private network address carried in the allocation request, the allocation module 1003 allocates the public network address and the port range to the first private network address according to the search result obtained by the search module 1002, and divides the port range into the first port set and the second port set, and the sending module 1004 synchronizes the first private network address, the allocated public network address, the allocated port range, and the second port set to the second CGN device, refer to steps S601 to S605 in Embodiment 3 of the present disclosure.

The receiving module 1001 is further configured to receive a second to-be-sent packet sent by a NAT device.

The search module 1002 is further configured to search the correspondence for a public network address and a port range that are correspondingly allocated to a source address of the second to-be-sent packet received by the receiving module 1001.

The allocation module 1003 is further configured to allocate a public network address and a port range to the source address of the second to-be-sent packet based on a search result indicating that the public network address and the port range that are correspondingly allocated to the source address of the second to-be-sent packet are not in the correspondence, where the search result is obtained by the search module 1002, and determine a first port set and a second port set from the port range allocated to the source address of the second to-be-sent packet.

The sending module 1004 is further configured to synchronize, to the second CGN device, the second port set and a correspondence between the source address of the second to-be-sent packet, the public network address allocated by the allocation module 1003, and the port range allocated by the allocation module 1003.

The CGN device further includes a port determining module 1006.

The port determining module 1006 is configured to determine, based on a search result indicating that the public network address and the port range that are correspondingly allocated to the source address of the second to-be-sent packet are in the correspondence, an unallocated port from a first port set of the port range found by the search module 1002, where the search result is obtained by the search module 1002.

The sending module 1004 is further configured to replace the source address of the second to-be-sent packet with the public network address found by the search module 1002, and replace a source port of the second to-be-sent packet with the port determined by the port determining module 1006, to generate a modified packet, and send the modified packet.

Further, for an address allocation procedure in which the receiving module 1001 receives the second to-be-sent packet sent by the NAT device, the search module 1002 searches the correspondence for the source address of the second to-be-sent packet, the allocation module 1003 allocates the public network address and the port range to the source address of the second to-be-sent packet according to the search result obtained by the search module 1002, and divides the allocated port range into the first port set and the second port set, and the sending module 1004 synchronizes the first private network address, the allocated public network address, the allocated port range, and the second port set to the second CGN device, modifies the source address and the source port that are of the second to-be-sent packet, and sends the modified packet, refer to steps S606 to S612 in Embodiment 3 of the present disclosure.

Figure 11:
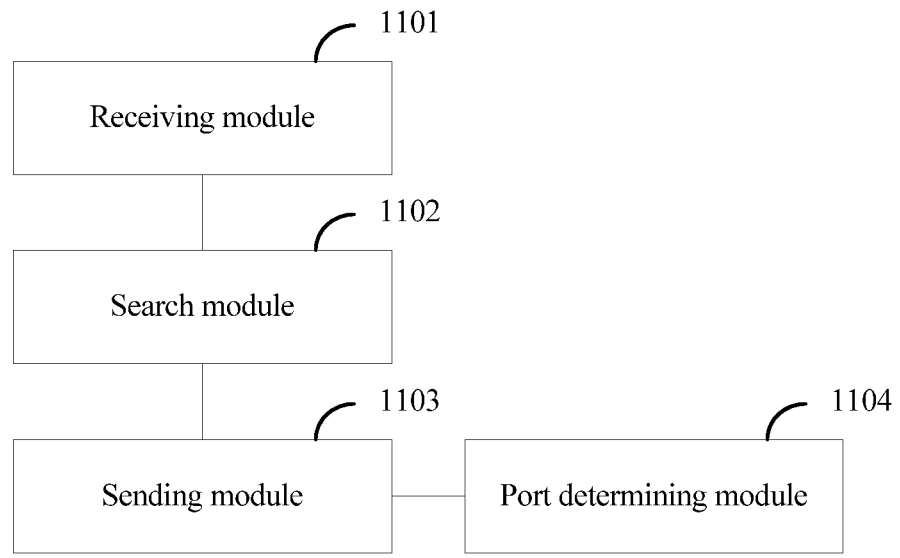
FIG. 11 is a schematic structural diagram of another CGN device according to an embodiment of the present disclosure.

Another CGN device provided in an embodiment of the present disclosure is configured to perform functions of the second CGN device described in the foregoing method embodiments. For an application scenario of the CGN device, a connection relationship with other devices such as a first CGN device and a NAT device, and a packet exchanging procedure, reference may be made to descriptions in the foregoing method embodiments. As shown in FIG. 11, the CGN device includes a receiving module 1101 configured to receive a first to-be-sent packet sent by a NAT device, a search module 1102 configured to search a recorded correspondence between a private network address, a public network address, and a port range for a public network address and a port range that are correspondingly allocated to a source address of the first to-be-sent packet received by the receiving module 1101, and a sending module 1103 configured to send an address allocation request to a first CGN device based on a search result indicating that the public network address and the port range that are correspondingly allocated to the source address of the first to-be-sent packet are not in the correspondence, where the search result is obtained by the search module 1102, and the address allocation request carries the source address of the first to-be-sent packet.

The receiving module 1101 is further configured to receive a correspondence between the source address of the first to-be-sent packet, the public network address, and the port range, where the correspondence is sent by the first CGN device for the address allocation request sent by the sending module 1103.

The first CGN device is a device that is preset in a CGN dual-active scenario and that is configured to allocate a public network address and a port range to a private network address, and the CGN device is a device that is preset in a CGN dual-active scenario and that is not configured to allocate a public network address and a port range to a private network address.

The CGN device further includes a port determining module 1104.

The port determining module 1104 is configured to determine, based on a search result indicating that the public network address and the port range that are correspondingly allocated to the source address of the first to-be-sent packet are in the correspondence, an unallocated port from a second port set of the port range found by the search module 1102, where the search result is obtained by the search module 1102.

The sending module 1103 is further configured to replace the source address of the first to-be-sent packet with the public network address found by the search module 1102, and replace a source port of the first to-be-sent packet with the port determined by the port determining module 1104, to generate a modified packet, and send the modified packet.

The port range is divided into a first port set and the second port set according to a preset division rule, the first port set is a port set that is used by the first CGN device to allocate ports, the second port set is a port set that is used by the CGN device to allocate ports, and a port identifier in the first port set is different from a port identifier in the second port set.

Further, for an address allocation procedure in which the receiving module 1101 receives the first to-be-sent packet sent by the NAT device, the search module 1102 searches the correspondence for the source address of the first to-be-sent packet, the sending module 1103 sends the address allocation request to the first CGN device according to the search result indicating that the search module 1102 does not find the source address, the receiving module 1101 receives the public network address and the port range that are allocated to the source address and returned by the first CGN device, the port determining module 1104 determines the port from the second port set of the allocated port range, and the sending module 1103 sends the packet with the modified source address and source port, refer to steps S501 to S506 in Embodiment 2 of the present disclosure.

The receiving module 1101 is further configured to receive the correspondence between the source address of the first to-be-sent packet, the public network address, and the port range, and a second port set determined by the first CGN device from the port range, where the correspondence and the second port set are sent by the first CGN device, the first CGN device divides the port range into a first port set and the second port set, the first port set is a port set that is used by the first CGN device to allocate ports, the second port set is a port set that is used by the CGN device to allocate ports, and a port identifier in the first port set is different from a port identifier in the second port set.

The receiving module 1101 is further configured to receive a correspondence between another private network address, a public network address, and a port range, and a second port set determined by the first CGN device from the port range, where the correspondence and the second port set are sent by the first CGN device, and the other private network address is a source address of a packet sent by the NAT device and received by the first CGN device.

The CGN device further includes a port determining module 1104.

The port determining module 1104 is configured to determine, based on a search result indicating that the public network address and the port range that are correspondingly allocated to the source address of the first to-be-sent packet are in the correspondence, an unallocated port from a second port set of the port range found by the search module 1102, where the search result is obtained by the search module 1102.

The sending module 1103 is further configured to replace the source address of the first to-be-sent packet with the public network address found by the search module 1102, and replace a source port of the first to-be-sent packet with the port determined by the port determining module 1104, to generate a modified packet, and send the modified packet.

Further, for an address allocation procedure in which the receiving module 1101 receives the first to-be-sent packet sent by the NAT device, the search module 1102 searches the correspondence for the source address of the first to-be-sent packet, the sending module 1103 sends the address allocation request to the first CGN device according to the search result indicating that the search module 1102 does not find the source address, the receiving module 1101 receives the public network address, the port range, and the second port set that are returned by the first CGN device, where the public network address and the port range are allocated to the source address, the port determining module 1104 determines the port from the second port set, and the sending module 1103 sends the packet with the modified source address and source port, refer to steps S701 to S707 in Embodiment 4 of the present disclosure.

A CGN dual-active system provided in an embodiment of the present disclosure includes the foregoing CGN device and the foregoing another CGN device.

Based on a same disclosure conception, the embodiments of the present disclosure further provide a device and a system that are configured to allocate address. Because principles of resolving a problem by the device and the system are similar to those of the foregoing address allocation method, for implementation of the device and the system, reference may be made to implementation of the method, and repeated parts are not described.

Figure 12:
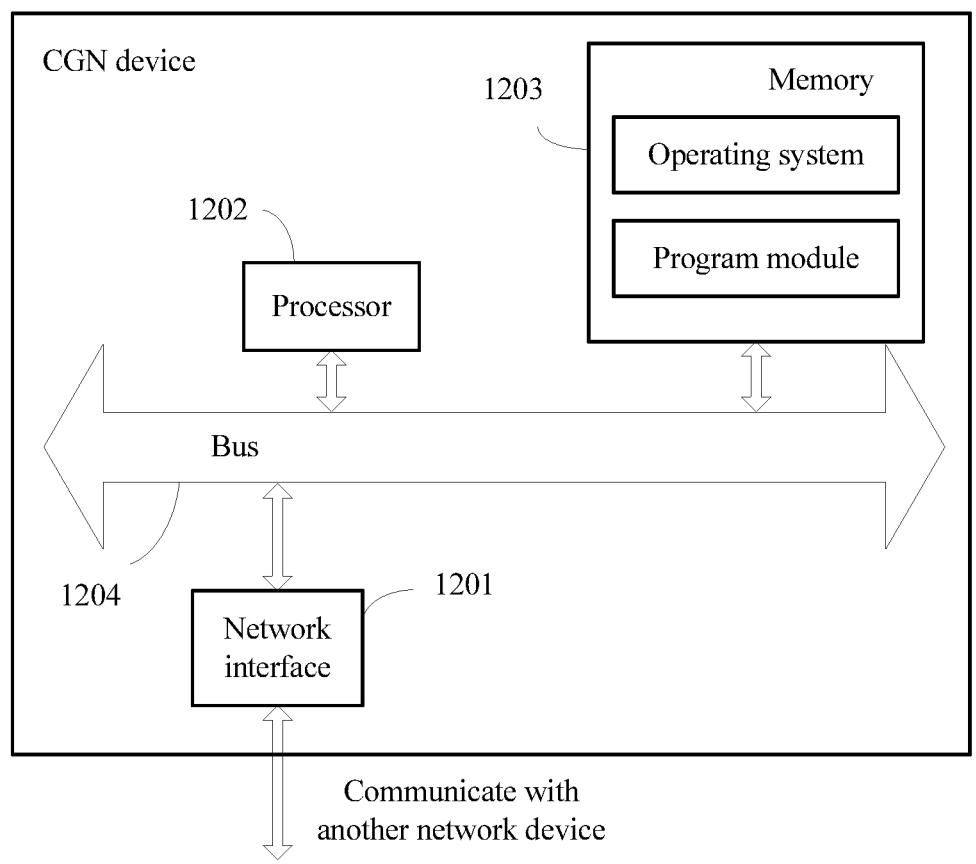
FIG. 12 is a schematic structural diagram of still another CGN device according to an embodiment of the present disclosure.

An embodiment of the present disclosure provides a still another CGN device that is configured to perform functions of the first CGN device described in the method embodiments. For an application scenario of the CGN device, a connection relationship with other devices such as a second CGN device and a NAT device, and a packet exchanging procedure, reference may be made to descriptions in the foregoing method embodiments. As shown in FIG. 12, the CGN device includes a network interface 1201, a processor 1202 (there may be one or more processors, and one processor is used as an example in the embodiments of the present disclosure), a memory 1203, and a bus system 1204.

The network interface 1201 may be a wired interface such as a fiber distributed data interface (FDDI) or a Gigabit Ethernet (GE) interface, or the network interface 1201 may be a wireless interface.

The processor 1202 controls an operation of the still another CGN device, and the processor 1202 may also be referred to as a central processing unit (CPU). The processor 1202 may be an integrated circuit chip with a signal processing capability, or the processor 1202 may be a general-purpose processor, a digital signal processor (DSP), an application-specific integrated circuit (ASIC), a field-programmable gate array (FPGA) or another programmable logic device, a discrete gate or a transistor logic device, or a discrete hardware assembly. The general-purpose processor may be a microprocessor, or the processor 1202 may be any conventional processor or the like.

The memory 1203 may include a read-only memory (ROM) and a random access memory (RAM), and provides an instruction and data to the processor 1202. A part of the memory 1203 may further include a non-volatile random access memory (NVRAM).

All components of the still another CGN device are coupled together using the bus system 1204. The bus system 1204 includes a power supply bus, a control bus, a state signal bus, and the like in addition to a data bus. The bus system 1204 may be an industry standard architecture (ISA) bus, a peripheral component interconnect (PCI) bus, an extended industry standard architecture (EISA) bus, or the like. The bus system 1204 may be one or more physical lines. When the bus system 1204 is multiple physical lines, the bus system 1204 may be categorized into an address bus, a data bus, a control bus, and the like. In other embodiments of the present disclosure, the processor 1202, the memory 1203, and the network interface 1201 may also be directly connected using a communications line. However, for clear description, various buses in the figure are denoted by the bus system 1204.

The memory 1203 stores the following elements, an executable module or a data structure, or a subset thereof, or an extended set thereof, an operation instruction including various operation instructions, and used to implement various operations, and an operating system including various system programs, and used to implement various basic services and handle hardware-based tasks.

In this embodiment of the present disclosure, the processor 1202 performs an operation by invoking an operation instruction stored in the memory 1203 (the operation instruction may be stored in the operating system). The network interface 1201 is configured to receive an address allocation request sent by a second CGN device, where the address allocation request carries a first private network address. The processor 1202 is configured to search a recorded correspondence between a private network address, a public network address, and a port range for the first private network address received by the network interface 1201, and allocate a public network address and a port range to the first private network address based on a search result indicating that the first private network address is not in the correspondence, and record a correspondence between the first private network address, the allocated public network address, and the allocated port range, and the network interface 1201 is further configured to synchronize, to the second CGN device, the correspondence between the first private network address, the public network address allocated by the processor 1202, and the port range allocated by the processor 1202.

The CGN device is a device that is preset in a CGN dual-active scenario and that is configured to allocate a public network address and a port range to a private network address, and the second CGN device is a device that is preset in a CGN dual-active scenario and that is not configured to allocate a public network address and a port range to a private network address.

Further, for an address allocation procedure in which the network interface 1201 receives the address allocation request sent by the second CGN device, the processor 1202 searches for the first private network address carried in the allocation request, and allocates the public network address and the port range to the first private network address according to the search result, and the network interface 1201 synchronizes the first private network address, the allocated public network address, and the allocated port range to the second CGN device, refer to steps S401 to S404 in Embodiment 1 of the present disclosure.

The network interface 1201 is further configured to obtain a first to-be-sent packet.

The processor 1202 is further configured to search the correspondence for a public network address and a port range that are correspondingly allocated to a source address of the first to-be-sent packet obtained by the network interface 1201, and determine, based on a search result indicating that the public network address and the port range that are correspondingly allocated to the source address of the first to-be-sent packet are in the correspondence, an unallocated port from a first port set of the found port range.

The network interface 1201 is further configured to replace the source address of the first to-be-sent packet with the public network address found by the processor 1202, and replace a source port of the first to-be-sent packet with the port determined by the processor 1202, to generate a modified packet, and send the modified packet.

The port range is divided into a second port set and the first port set according to a preset division rule, the first port set is a port set that is used by the CGN device to allocate ports, the second port set is a port set that is used by the second CGN device to allocate ports, and a port identifier in the first port set is different from a port identifier in the second port set.

Further, for an address allocation procedure in which the network interface 1201 obtains the first to-be-sent packet, the processor 1202 searches for the public network address and the port range that are corresponding to the source address of the first to-be-sent packet, and determines, from the first port set, an available port for the first to-be-sent packet according to the search result, and the network interface 1201 sends the modified packet with the replaced source address and source port, refer to steps S405 to S410 in Embodiment 1 of the present disclosure.

The processor 1202 is further configured to determine a first port set and a second port set from the port range allocated to the first private network address, where the first port set is a port set that is used by the CGN device to allocate ports, the second port set is a port set that is used by the second CGN device to allocate ports, and a port identifier in the first port set is different from a port identifier in the second port set.

The network interface 1201 is further configured to synchronize, to the second CGN device, the determined second port set and the correspondence between the first private network address, the public network address allocated by the processor 1202, and the port range allocated by the processor 1202.

Further, for an address allocation procedure in which the network interface 1201 receives the address allocation request sent by the second CGN device, the processor 1202 searches for the first private network address carried in the allocation request, allocates the public network address and the port range to the first private network address according to the search result, and divides the port range into the first port set and the second port set, and the network interface 1201 synchronizes the first private network address, the allocated public network address, the allocated port range, and the second port set to the second CGN device, refer to steps S601 to S605 in Embodiment 3 of the present disclosure.

The network interface 1201 is further configured to receive a second to-be-sent packet sent by a NAT device.

The processor 1202 is further configured to search the correspondence for a public network address and a port range that are correspondingly allocated to a source address of the second to-be-sent packet received by the network interface 1201, allocate a public network address and a port range to the source address of the second to-be-sent packet based on a search result indicating that the public network address and the port range that are correspondingly allocated to the source address of the second to-be-sent packet are not in the correspondence, and determine a first port set and a second port set from the port range allocated to the source address of the second to-be-sent packet.

The network interface 1201 is further configured to synchronize, to the second CGN device, the second port set and a correspondence between the source address of the second to-be-sent packet, the public network address allocated by the processor 1202, and the port range allocated by the processor 1202.

The processor 1202 is further configured to determine, based on a search result indicating that the public network address and the port range that are correspondingly allocated to the source address of the second to-be-sent packet are in the correspondence, an unallocated port from a first port set of the found port range.

The network interface 1201 is further configured to replace the source address of the second to-be-sent packet with the public network address found by the processor 1202, and replace a source port of the second to-be-sent packet with the port determined by the processor 1202, to generate a modified packet, and send the modified packet.

Further, for an address allocation procedure in which the network interface 1201 receives the second to-be-sent packet sent by the NAT device, the processor 1202 searches the correspondence for the source address of the second to-be-sent packet, allocates the public network address and the port range to the source address of the second to-be-sent packet according to the search result, and divides the port range into the first port set and the second port set, and the network interface 1201 synchronizes the first private network address, the allocated public network address, the allocated port range, and the second port set to the second CGN device, modifies the source address and the source port that are of the second to-be-sent packet, and sends the modified packet, refer to steps S606 to S612 in Embodiment 3 of the present disclosure.

Figure 13:
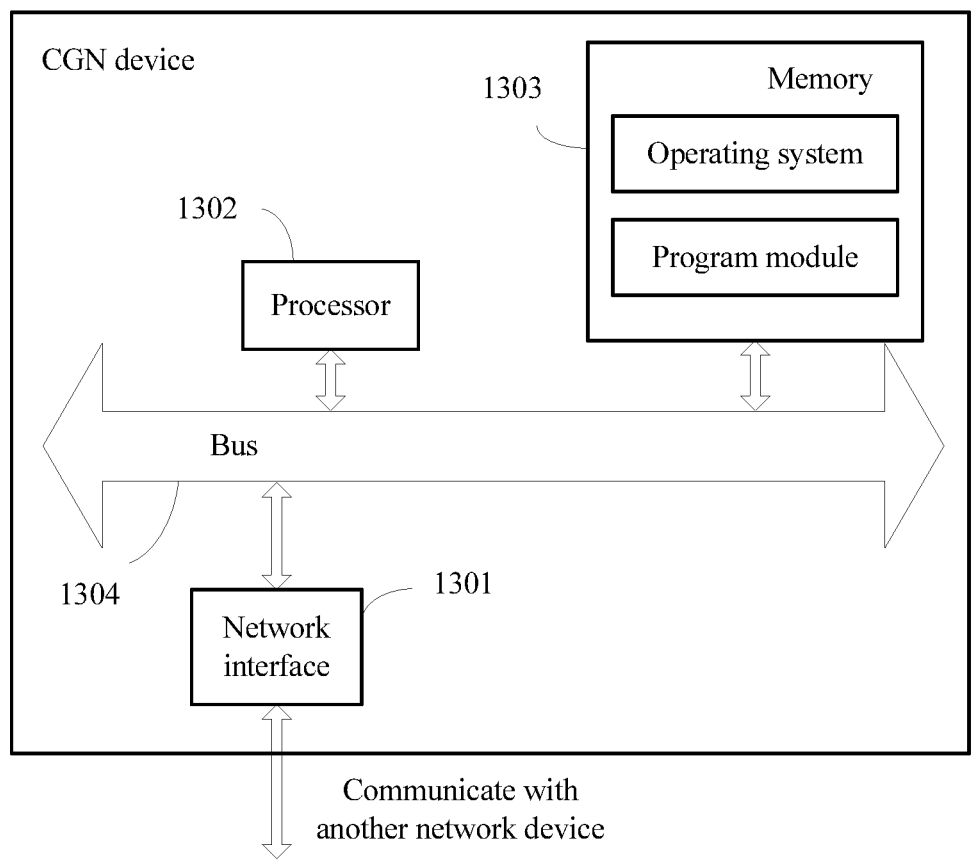
FIG. 13 is a schematic structural diagram of yet another CGN device according to an embodiment of the present disclosure.

An embodiment of the present disclosure provides a yet another CGN device that is configured to perform functions of the second CGN device described in the method embodiments. For an application scenario of the CGN device, a connection relationship with other devices such as a first CGN device and a NAT device, and a packet exchanging procedure, reference may be made to descriptions in the foregoing method embodiments. As shown in FIG. 13, the CGN device includes a network interface 1301, a processor 1302 (there may be one or more processors, and one processor is used as an example in the embodiments of the present disclosure), a memory 1303, and a bus system 1304.

The network interface 1301 may be a wired interface such as an FDDI or a GE interface, or the network interface 1301 may be a wireless interface.

The processor 1302 controls an operation of the yet another CGN device, and the processor 1302 may also be referred to as a CPU. The processor 1302 may be an integrated circuit chip with a signal processing capability, or the processor 1302 may be a general-purpose processor, a DSP, an ASIC, a FPGA or another programmable logic device, a discrete gate or a transistor logic device, or a discrete hardware assembly. The general-purpose processor may be a microprocessor, or the processor 1302 may be any conventional processor or the like.

The memory 1303 may include a ROM and a RAM, and provides an instruction and data to the processor 1302. A part of the memory 1303 may further include a NVRAM.

All components of the still another CGN device are coupled together using the bus system 1304. The bus system 1304 includes a power supply bus, a control bus, a state signal bus, and the like in addition to a data bus. The bus system 1304 may be an ISA bus, a PCI bus, an EISA bus, or the like. The bus system 1304 may be one or more physical lines. When the bus system 1304 is multiple physical lines, the bus system 1304 may be categorized into an address bus, a data bus, a control bus, and the like. In other embodiments of the present disclosure, the processor 1302, the memory 1303, and the network interface 1301 may also be directly connected using a communications line. However, for clear description, various buses in the figure are denoted by the bus system 1304.

The memory 1303 stores the following elements, an executable module or a data structure, or a subset thereof, or an extended set thereof, an operation instruction including various operation instructions, and used to implement various operations, and an operating system including various system programs, and used to implement various basic services and handle hardware-based tasks.

In this embodiment of the present disclosure, the processor 1302 performs an operation by invoking an operation instruction stored in the memory 1303 (the operation instruction may be stored in the operating system). The network interface 1301 is configured to receive a first to-be-sent packet sent by a NAT device, and the processor 1302 is configured to search a recorded correspondence between a private network address, a public network address, and a port range for a public network address and a port range that are correspondingly allocated to a source address of the first to-be-sent packet received by the network interface 1301.

The network interface 1301 is further configured to send an address allocation request to a first CGN device based on a search result indicating that the public network address and the port range that are correspondingly allocated to the source address of the first to-be-sent packet are not in the correspondence, where the search result is obtained by the processor 1302, and the address allocation request carries the source address of the first to-be-sent packet, and receive a correspondence between the source address of the first to-be-sent packet, the public network address, and the port range, where the correspondence is sent by the first CGN device for the address allocation request sent by the network interface 1301.

The first CGN device is a device that is preset in a CGN dual-active scenario and that is configured to allocate a public network address and a port range to a private network address, and the CGN device is a device that is preset in a CGN dual-active scenario and that is not configured to allocate a public network address and a port range to a private network address.

The processor 1302 is further configured to determine, based on a search result indicating that the public network address and the port range that are correspondingly allocated to the source address of the first to-be-sent packet are in the correspondence, an unallocated port from a second port set of the found port range.

The network interface 1301 is further configured to replace the source address of the first to-be-sent packet with the public network address found by the processor 1302, and replace a source port of the first to-be-sent packet with the port determined by the processor 1302, to generate a modified packet, and send the modified packet.

The port range is divided into a first port set and the second port set according to a preset division rule, the first port set is a port set that is used by the first CGN device to allocate ports, the second port set is a port set that is used by the CGN device to allocate ports, and a port identifier in the first port set is different from a port identifier in the second port set.

Further, for an address allocation procedure in which the network interface 1301 receives the first to-be-sent packet sent by the NAT device, the processor 1302 searches the correspondence for the source address of the first to-be-sent packet, the network interface 1301 sends the address allocation request to the first CGN device according to the search result indicating that the processor 1302 does not find the source address, the network interface 1301 receives the public network address and the port range that are allocated to the source address and returned by the first CGN device, the processor 1302 determines the port from the second port set of the allocated port range, and the network interface 1301 sends the packet with the modified source address and source port, refer to steps S501 to S506 in Embodiment 2 of the present disclosure.

The network interface 1301 is further configured to receive the correspondence between the source address of the first to-be-sent packet, the public network address, and the port range, and a second port set determined by the first CGN device from the port range, where the correspondence and the second port set are sent by the first CGN device, the first CGN device divides the port range into a first port set and the second port set, the first port set is a port set that is used by the first CGN device to allocate ports, the second port set is a port set that is used by the CGN device to allocate ports, and a port identifier in the first port set is different from a port identifier in the second port set.

The network interface 1301 is further configured to receive a correspondence between another private network address, a public network address, and a port range, and a second port set determined by the first CGN device from the port range, where the correspondence and the second port set are sent by the first CGN device, and the other private network address is a source address of a packet sent by the NAT device and received by the first CGN device.

The processor 1302 is further configured to determine, based on a search result indicating that the public network address and the port range that are correspondingly allocated to the source address of the first to-be-sent packet are in the correspondence, an unallocated port from a second port set of the found port range.

The network interface 1301 is further configured to replace the source address of the first to-be-sent packet with the public network address found by the processor 1302, and replace a source port of the first to-be-sent packet with the port determined by the processor 1302, to generate a modified packet, and send the modified packet.

Further, for an address allocation procedure in which the network interface 1301 receives the first to-be-sent packet sent by the NAT device, the processor 1302 searches the correspondence for the source address of the first to-be-sent packet, the network interface 1301 sends the address allocation request to the first CGN device according to the search result indicating that the processor 1302 does not find the source address, the network interface 1301 receives the public network address, the port range, and the second port set that are returned by the first CGN device, where the public network address and the port range are allocated to the source address, the processor 1302 determines the port from the second port set, and the network interface 1301 sends the packet with the modified source address and source port, refer to steps S701 to S707 in Embodiment 4 of the present disclosure.

A CGN dual-active system provided in an embodiment of the present disclosure includes the foregoing still another CGN device and the foregoing yet another CGN device.

Functions of the foregoing units may correspond to corresponding processing steps in procedures shown in FIG. 2 to FIG. 7, and are not described repeatedly herein.

According to the address allocation method, the CGN device, and the CGN dual-active system that are provided in the embodiments of the present disclosure, in a CGN dual-active scenario, it is preset that a first CGN device is determined as a device configured to allocate a public network address and a port range to a private network address, and that a second CGN device is determined as a device that is not configured to allocate a public network address and a port range to a private network address. When receiving a first to-be-sent packet sent by a NAT device, the second CGN device searches a recorded correspondence between a private network address, a public network address, and a port range for a source address of the first to-be-sent packet, and sends an address allocation request to the first CGN device based on a search result indicating that the source address of the first to-be-sent packet is not in the correspondence. When receiving the address allocation request, the first CGN device searches a recorded correspondence between a private network address, a public network address, and a port range for a first private network address carried in the address allocation request. Based on a search result indicating that the first private network address is not in the correspondence, the first CGN device allocates a public network address and a port range to the first private network address, records a correspondence between the first private network address, the allocated public network address, and the allocated port range, and synchronizes the correspondence between the first private network address, the allocated public network address, and the allocated port range to the second CGN device. In the address allocation method provided in the embodiments of the present disclosure, in two CGN devices in a CGN dual-active scenario, one CGN device (the first CGN device) is determined for allocating a public network address and a port range to a private address, and the other CGN device (the second CGN device) is determined for not allocating a public network address and a port range to a private address, thereby avoiding that two CGN devices allocate different public network addresses and different port ranges to a same private network address because the two CGN devices are not synchronized in time. Therefore, a private network can be allocated with only one public network address and one port range, source tracing consistency is ensured, and no public network address resources and port resources are wasted.

Based on the foregoing descriptions of the implementation manners, a person skilled in the art may clearly understand that the present disclosure may be implemented by hardware or by software in addition to a necessary general hardware platform. Based on such an understanding, the technical solutions in the embodiments of the present disclosure may be implemented in a form of a software product. The software product is stored in a non-volatile storage medium (which may be a compact disc ROM (CD-ROM), a universal serial bus (USB) flash drive, a removable hard disk, or the like) and includes several instructions for instructing a computer device (which may be a personal computer, a server, a network device, or the like) to execute the methods described in the embodiments of the present disclosure.

A person skilled in the art may understand that the accompanying drawings are merely schematic diagrams of embodiments, and modules or processes in the accompanying drawings are not necessarily required for implementing the present disclosure.

A person skilled in the art may understand that the modules in the apparatuses provided in the embodiments may be arranged in the apparatuses in a distributed manner according to the description of the embodiments, or may be arranged in one or more apparatuses that are different from those described in the embodiments. The modules in the foregoing embodiments may be combined into one module, or split into a plurality of submodules.

The sequence numbers of the foregoing embodiments of the present disclosure are merely for illustrative purposes, and are not intended to indicate priorities of the embodiments.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:
1. An address allocation method, comprising:
receiving, by a first carrier grade network address translation (CGN) device, an address allocation request sent by a second CGN device, wherein the address allocation request comprises a first private network address;
searching, by the first CGN device, a recorded correspondence between a private network address, a public network address, and a port range for the first private network address;
allocating, by the first CGN device, a public network address and a port range to the first private network address using a search result indicating that the first private network address is not in the correspondence;
recording a correspondence between the first private network address, the allocated public network address, and the allocated port range; and synchronizing the correspondence between the first private network address, the allocated public network address, and the allocated port range to the second CGN device, wherein the first CGN device is preset in a CGN dual-active scenario and configured to allocate a public network address and a port range to a private network address, and wherein the second CGN device is preset in the CGN dual-active scenario and not configured to allocate the public network address and the port range to the private network address.

2. The method according to claim 1, further comprising:
obtaining, by the first CGN device, a first to-be-sent packet;
determining whether the first to-be-sent packet is an initial packet;
searching the correspondence for a public network address and a port range that are correspondingly allocated to a source address of the first to-be-sent packet when the first to-be-sent packet is the initial packet;
determining, by the first CGN device based on a search result indicating that the public network address and the port range that are correspondingly allocated to the source address of the first to-be-sent packet are in the correspondence, an unallocated port from a first port set of the found port range;
replacing the source address of the first to-be-sent packet with the found public network address;
replacing a source port of the first to-be-sent packet with the determined port, to generate a modified packet; and
sending the modified packet, wherein the port range is divided into a second port set and the first port set according to a preset division rule,
wherein the first port set is used by the first CGN device to allocate ports,
wherein the second port set is used by the second CGN device to allocate ports, and
wherein a port identifier in the first port set is different from a port identifier in the second port set.

3. The method according to claim 1, wherein synchronizing the correspondence between the first private network address, the allocated public network address, and the allocated port range to the second CGN device comprises:
determining a first port set and a second port set from the port range allocated to the first private network address, wherein the first port set is used by the first CGN device to allocate ports, wherein the second port set is used by the second CGN device to allocate ports, and wherein a port identifier in the first port set is different from a port identifier in the second port set; and
synchronizing the second port set and the correspondence between the first private network address, the allocated public network address, and the allocated port range to the second CGN device.

4. The method according to claim 1, further comprising:
receiving, by the first CGN device, a second to-be-sent packet sent by a network address translation (NAT) device;
searching the correspondence for a public network address and a port range that are correspondingly allocated to a source address of the second to-be-sent packet;
allocating a public network address and a port range to the source address of the second to-be-sent packet based on a search result indicating that the public network address and the port range that are correspondingly allocated to the source address of the second to-be-sent packet are not in the correspondence;
determining a first port set and a second port set from the port range allocated to the source address of the second to-be-sent packet; and
synchronizing the second port set and a correspondence between the source address of the second to-be-sent packet, the allocated public network address, and the allocated port range to the second CGN device.

5. The method according to claim 4, wherein based on a search result indicating that the public network address and the port range that are correspondingly allocated to the source address of the second to-be-sent packet are in the correspondence, the method further comprises:
determining an unallocated port from a first port set of the found port range;
replacing the source address of the second to-be-sent packet with the found public network address;
replacing a source port of the second to-be-sent packet with the determined port, to generate a modified packet; and
sending the modified packet.

6. An address allocation method, comprising:
receiving, by a second carrier grade network address translation (CGN) device, a first to-be-sent packet sent by a network address translation (NAT) device;
searching a recorded correspondence between a private network address, a public network address, and a port range for a public network address and a port range that are correspondingly allocated to a source address of the first to-be-sent packet;
sending, by the second CGN device, an address allocation request to a first CGN device based on a search result indicating that the public network address and the port range that are correspondingly allocated to the source address of the first to-be-sent packet are not in the correspondence, wherein the address allocation request comprises the source address of the first to-be-sent packet; and
receiving, from the first CGN device, a correspondence between the source address of the first to-be-sent packet, the public network address, and the port range,
wherein the first CGN device is preset in a CGN dual-active scenario and configured to allocate a public network address and a port range to a private network address, and
wherein the second CGN device is preset in the CGN dual-active scenario and not configured to allocate the public network address and the port range to the private network address.

7. The method according to claim 6, wherein based on a search result indicating that the public network address and the port range that are correspondingly allocated to the source address of the first to-be-sent packet are in the correspondence, the method further comprises:
determining, by the second CGN device, an unallocated port from a second port set of the found port range;
replacing the source address of the first to-be-sent packet with the found public network address;
replacing a source port of the first to-be-sent packet with the determined port, to generate a modified packet; and
sending the modified packet, wherein the port range is divided into a first port set and the second port set according to a preset division rule,
wherein the first port set is used by the first CGN device to allocate ports, wherein the second port set is used by the second CGN device to allocate ports, and wherein a port identifier in the first port set is different from a port identifier in the second port set.

8. The method according to claim 6, wherein receiving the correspondence between the source address of the first to-be-sent packet, the allocated public network address, and the allocated port range further comprises receiving the correspondence between the source address of the first to-be-sent packet, the public network address, and the port range, and a second port set determined by the first CGN device from the port range, wherein the correspondence and the second port set are sent by the first CGN device, wherein the first CGN device divides the port range into a first port set and the second port set, wherein the first port set is used by the first CGN device to allocate ports, wherein the second port set is used by the second CGN device to allocate ports, and wherein a port identifier in the first port set is different from a port identifier in the second port set.

9. The method according to claim 8, further comprising receiving a correspondence between another private network address, a public network address, and a port range, and the second port set determined by the first CGN device from the port range, wherein the correspondence and the second port set are sent by the first CGN device, and wherein the other private network address is a source address of a packet sent by the NAT device and received by the first CGN device.

10. The method according to claim 8, wherein based on a search result indicating that the public network address and the port range that are correspondingly allocated to the source address of the first to-be-sent packet are in the correspondence, the method further comprises:

determining, by the second CGN device, an unallocated port from a second port set of the found port range;

replacing the source address of the first to-be-sent packet with the found public network address;

replacing a source port of the first to-be-sent packet with the determined port, to generate a modified packet; and sending the modified packet.

11. A carrier grade network address translation (CGN) device that is used as a first CGN device, comprising:

a network interface configured to receive an address allocation request sent by a second CGN device, wherein the address allocation request comprises a first private network address;

a memory comprising instructions; and one or more processors in communication with the memory and execute the instructions to:

search a recorded correspondence between a private network address, a public network address, and a port range for the first private network address received by the network interface;

allocate a public network address and a port range to the first private network address based on a search result indicating that the first private network address is not in the correspondence;

record a correspondence between the first private network address, the allocated public network address, and the allocated port range, wherein the network interface is further configured to synchronize, to the second CGN device, the correspondence between the first private network address, the public network address allocated by the one or more processors, and the port range allocated by the one or more processors, wherein the CGN device is preset in a CGN dual-active scenario and configured to allocate a public network address and a port range to a private network address, and wherein the second CGN device is preset in the CGN dual-active scenario and not configured to allocate the public network address and the port range to the private network address.

12. The CGN device according to claim 11, wherein the network interface is further configured to obtain a first to-be-sent packet, wherein the one or more processors further execute the instructions to:

search the correspondence for a public network address and a port range that are correspondingly allocated to a source address of the first to-be-sent packet obtained by the network interface; and determine, based on a search result indicating that the public network address and the port range that are correspondingly allocated to the source address of the first to-be-sent sent packet are in the correspondence, an unallocated port from a first port set of the found port range, wherein the network interface is further configured to:

replace the source address of the first to-be-sent packet with the public network address found by the one or more processors;

replace a source port of the first to-be-sent packet with the port determined by the one or more processors, to generate a modified packet; and send the modified packet, wherein the port range is divided into a second port set and the first port set according to a preset division rule, wherein the first port set is used by the CGN device to allocate ports, wherein the second port set is used by the second CGN device to allocate ports, and wherein a port identifier in the first port set is different from a port identifier in the second port set.

13. The CGN device according to claim 11, wherein the one or more processors further execute the instructions to determine a first port set and a second port set from the port range allocated to the first private network address, wherein the first port set is used by the CGN device to allocate ports, wherein the second port set is used by the second CGN device to allocate ports, wherein a port identifier in the first port set is different from a port identifier in the second port set, and wherein the network interface is further configured to synchronize, to the second CGN device, the determined second port set and the correspondence between the first private network address, the allocated public network address, and the port range allocated by the one or more processors.

14. The CGN device according to claim 11, wherein the network interface is further configured to receive a second to-be-sent packet sent by a network address translation (NAT) device, wherein the one or more processors further execute the instructions to:

search the correspondence for a public network address and a port range that are correspondingly allocated to a source address of the second to-be-sent packet received by the network interface;

allocate a public network address and a port range to the source address of the second to-be-sent packet based on a search result indicating that the public network address and the port range that are correspondingly allocated to the source address of the second to-be-sent packet are not in the correspondence; and determine a first port set and a second port set from the port range allocated to the source address of the second to-be-sent packet, and wherein the network interface is further configured to synchronize, to the second CGN device, the second port set and a correspondence between the source address of the second to-be-sent packet, the public network address allocated by the one or more processors, and the port range allocated by the one or more processors.

15. The CGN device according to claim 14, wherein the one or more processors further execute the instructions to determine, based on a search result indicating that the public network address and the port range that are correspondingly allocated to the source address of the second to-be-sent packet are in the correspondence, an unallocated port from a first port set of the found port range, and wherein the network interface is further configured to:
replace the source address of the second to-be-sent packet with the public network address found by the one or more processors;
replace a source port of the second to-be-sent packet with the port determined by the one or more processors, to generate a modified packet; and
send the modified packet.

16. A carrier grade network address translation (CGN) device that is used as a second CGN device, comprising:
a network interface configured to receive a first to-be-sent packet sent by a network address translation (NAT) device;
a memory comprising instructions; and
one or more processors in communication with the memory and execute the instructions to search a recorded correspondence between a private network address, a public network address, and a port range for a public network address and a port range that are correspondingly allocated to a source address of the first to-be-sent packet received by the network interface, and wherein the network interface is further configured to:
send an address allocation request to a first CGN device based on a search result indicating that the public network address and the port range that are correspondingly allocated to the source address of the first to-be-sent packet are not in the correspondence, wherein the search result is obtained by the one or more processors, and wherein the address allocation request comprises the source address of the first to-be-sent packet; and
receive a correspondence between the source address of the first to-be-sent packet, the public network address, and the port range, wherein the correspondence is sent by the first CGN device for the address allocation request sent by the network interface, wherein the first CGN device is preset in a CGN dual-active scenario and configured to allocate a public network address and a port range to a private network address, and wherein the CGN device is preset in the CGN dual-active scenario and not configured to allocate the public network address and the port range to the private network address.

17. The CGN device according to claim 16, wherein the one or more processors further execute the instructions to determine, based on a search result indicating that the public network address and the port range that are correspondingly allocated to the source address of the first to-be-sent packet are in the correspondence, an unallocated port from a second port set of the found port range, wherein the network interface is further configured to:
replace the source address of the first to-be-sent packet with the public network address found by the one or more processors;
replace a source port of the first to-be-sent packet with the port determined by the one or more processors, to generate a modified packet; and
send the modified packet, wherein the port range is divided into a first port set and the second port set according to a preset division rule,
wherein the first port set is used by the first CGN device to allocate ports,
wherein the second port set is used by the CGN device to allocate ports, and
wherein a port identifier in the first port set is different from a port identifier in the second port set.

18. The CGN device according to claim 16, wherein the network interface is further configured to receive the correspondence between the source address of the first to-be-sent packet, the public network address, and the port range, and a second port set determined by the first CGN device from the port range, wherein the correspondence and the second port set are sent by the first CGN device, wherein the first CGN device divides the port range into a first port set and the second port set, wherein the first port set is used by the first CGN device to allocate ports, wherein the second port set is used by the CGN device to allocate ports, and wherein a port identifier in the first port set is different from a port identifier in the second port set.

19. The CGN device according to claim 18, wherein the network interface is further configured to receive a correspondence between another private network address, a public network address, and a port range, and the second port set determined by the first CGN device from the port range, wherein the correspondence and the second port set are sent by the first CGN device, and wherein the other private network address is a source address of a packet sent by the NAT device and received by the first CGN device.

20. The CGN device according to claim 18, wherein the one or more processors further execute the instructions to determine, based on a search result indicating that the public network address and the port range that are correspondingly allocated to the source address of the first to-be-sent packet are in the correspondence, an unallocated port from a second port set of the found port range, and wherein the network interface is further configured to:
replace the source address of the first to-be-sent packet with the public network address found by the one or more processors;
replace a source port of the first to-be-sent packet with the port determined by the one or more processors, to generate a modified packet; and
send the modified packet.

* * * * *